(12) United States Patent
Leung

(10) Patent No.: US 6,636,498 B1
(45) Date of Patent: Oct. 21, 2003

(54) MOBILE IP MOBILE ROUTER

(75) Inventor: Kent K. Leung, Mountain View, CA (US)

(73) Assignee: Cisco Technology, Inc., San Jose, CA (US)

(*) Notice: Subject to any disclaimer, the term of this patent is extended or adjusted under 35 U.S.C. 154(b) by 0 days.

(21) Appl. No.: 09/227,396

(22) Filed: Jan. 8, 1999

(51) Int. Cl.[7] .............................................. H04L 12/28
(52) U.S. Cl. ...................... 370/338; 370/328; 370/389; 370/401; 709/245
(58) Field of Search ................................ 370/338, 328, 370/401, 331, 389, 392

(56) References Cited

U.S. PATENT DOCUMENTS

| | | | |
|---|---|---|---|
| 4,692,918 A | 9/1987 | Elliott et al. ................... 370/85 |
| 5,016,244 A | 5/1991 | Massey et al. ................. 370/16 |
| 5,018,133 A | 5/1991 | Tsukakoshi et al. ... 340/825.05 |
| 5,218,600 A | 6/1993 | Schenkyr et al. ............. 370/16 |
| 5,371,852 A | 12/1994 | Attanasio et al. ........... 395/200 |
| 5,473,599 A | 12/1995 | Li et al. ........................ 370/16 |
| 5,572,528 A | * 11/1996 | Shuen ......................... 370/338 |
| 5,572,582 A | 11/1996 | Riddle |
| 5,619,552 A | 4/1997 | Karppanen et al. |
| 5,729,537 A | 3/1998 | Billstrom |
| 5,793,762 A | * 8/1998 | Penners et al. ............. 370/389 |
| 5,825,759 A | 10/1998 | Liu |
| 5,862,345 A | 1/1999 | Okanoue et al. |
| 6,078,575 A | 6/2000 | Dommety et al. |
| 6,130,892 A | * 10/2000 | Short et al. .................. 370/338 |
| 6,195,705 B1 | 2/2001 | Leung |
| 6,230,012 B1 | * 5/2001 | Willkie et al. ............... 455/435 |
| 6,407,988 B1 | * 6/2002 | Agraharam et al. ......... 370/328 |
| 6,434,134 B1 | * 8/2002 | La Porta et al. ............ 370/338 |

OTHER PUBLICATIONS

Release notes for 3Com Corporation, "Conducting a Redundant Route for Network Resiliency," Mar. 1994, *NET Builder Family Bridge/Router* pp. 26–29.
J. Moy, RFC 1247 "OSPF Version 2," Jul. 19, 1991.
D. Oran, RFC 1142 "OSI IS–IS Intra–domain Routing Protocol," Feb. 1990.
Uyless Black, "TCP/IP and Related Protocols," 1992, *McGraw–Hill, Inc.*, pp. 226–249.
T. Li, et al., RFC 2281 "Cisco Hot Standby Router Protocol (HSRP)," Mar. 1998.
Chambless, et al., "Home Agent Redundancy Protocol (HARP)," Oct. 27, 1997.
Network Working Group, RFC 2002 "IP Mobility Support," Oct. 1996.
C. Perkins, "*IP Mobility Support*," RFC2002, IBM Corporation, Oct. 1996.

(List continued on next page.)

*Primary Examiner*—Nay Maung
*Assistant Examiner*—Alan T. Gantt
(74) *Attorney, Agent, or Firm*—Beyer Weaver & Thomas LLP

(57) ABSTRACT

Methods and apparatus for implementing a Mobile IP mobile router are provided. In accordance with one aspect, the Home Agent receives a registration request packet. The registration request packet may include a care-of address for the mobile router. Networks associated with the mobile router are then identified. The Home Agent then updates a routing table to associate the identified networks with the care-of address. In addition, the Home Agent updates a mobility binding table with the care-of address for the mobile router. In accordance with another aspect, routing information is exchanged between the Home Agent and the mobile router. A routing table associated with at least one of the Home Agent and the mobile router is then updated as appropriate to include the exchanged routing information.

38 Claims, 17 Drawing Sheets

OTHER PUBLICATIONS

"*Mobile IP*," Release 12.0(1)T, pp. 1–55.

Montenegro, G., "*Reverse Tunneling for Mobile IP*," RFC 2344, Sun Microsystems, Inc., pp. 1–19, May 1998.

D. Harkins and D. Carrel, "*The Internet Key Exchange (IKE)*," Cisco Systems, pp. 1–33, Jun. 1998.

D. Cong and M. Hamlen, and C. Perkins, "*The Definitions of Managed Objects for IP Mobility Support using SMIv2*," RFC2006, Motorola and IBM, pp. 1–52, Oct. 1996.

J. Moy, RFC 1247 "*OSPF Version 2*", Jul. 19, 1991.

D. Oran, RFC 1142 "*OSI IS–IS Intra–Domain Routing Protocol*", Feb. 1990.

C. Finseth, "*An Access Control Protocol, Sometimes Called TACACS*", RFC 1492, pp. 1–15, Sep. 13, 1992.

D. Carrel and Lol Grant, "*The TACACS+ Protocol*", Network Working Group, Internet–Draft, Cisco Systems, pp. 1–42, Jan. 1997.

Rigney, "*RADIUS Accounting*", RFC 2139, Livingston, pp. 1–25, Apr. 1997.

C. Rigney, et al., "*Remote Authentication Dial in User Service (RADIUS)*", RFC 2138, pp. 1–65, Apr. 1997.

* cited by examiner

MOBILE IP MOBILE ROUTER

BACKGROUND OF THE INVENTION

1. Field of the Invention

The present invention relates to Mobile IP network technology. More particularly, the present invention relates to a Mobile IP mobile router.

2. Description of the Related Art

Mobile IP is a protocol which allows laptop computers or other mobile computer units (referred to as "Mobile Nodes" herein) to roam between various sub-networks at various locations—while maintaining internet and/or WAN connectivity. Without Mobile IP or related protocol, a Mobile Node would be unable to stay connected while roaming through various sub-networks. This is because the IP address required for any node to communicate over the internet is location specific. Each IP address has a field that specifies the particular sub-network on which the node resides. If a user desires to take a computer which is normally attached to one node and roam with it so that it passes through different sub-networks, it cannot use its home base IP address. As a result, a business person traveling across the country cannot merely roam with his or her computer across geographically disparate network segments or wireless nodes while remaining connected over the internet. This is not an acceptable state-of-affairs in the age of portable computational devices.

To address this problem, the Mobile IP protocol has been developed and implemented. An implementation of Mobile IP is described in RFC 2002 of the Network Working Group, C. Perkins, Ed., October 1996. Mobile IP is also described in the text "Mobile IP Unplugged" by J. Solomon, Prentice Hall. Both of these references are incorporated herein by reference in their entireties and for all purposes.

The Mobile IP process and environment are illustrated in FIG. 1A. As shown there, a Mobile IP environment 2 includes the internet (or a WAN) 4 over which a Mobile Node 6 can communicate remotely via mediation by a Home Agent 8 and a Foreign Agent 10. Typically, the Home Agent and Foreign Agent are routers or other network connection devices performing appropriate Mobile IP functions as implemented by software, hardware, and/or firmware. A particular Mobile Node (e.g., a laptop computer) plugged into its home network segment connects with the internet through its designated Home Agent. When the Mobile Node roams, it communicates via the internet through an available Foreign Agent. Presumably, there are many Foreign Agents available at geographically disparate locations to allow wide spread internet connection via the Mobile IP protocol. Note that it is also possible for the Mobile Node to register directly with its Home Agent.

As shown in FIG. 1A, Mobile Node 6 normally resides on (or is "based at") a network segment 12 which allows its network entities to communicate over the internet 4 through Home Agent 8 (an appropriately configured router denoted R2). Note that Home Agent 8 need not directly connect to the internet. For example, as shown in FIG. 1A, it may be connected through another router (a router R1 in this case). Router R1 may, in turn, connect one or more other routers (e.g., a router R3) with the internet.

Now, suppose that Mobile Node 6 is removed from its home base network segment 12 and roams to a remote network segment 14. Network segment 14 may include various other nodes such as a PC 16. The nodes on network segment 14 communicate with the internet through a router which doubles as Foreign Agent 10. Mobile Node 6 may identify Foreign Agent 10 through various solicitations and advertisements which form part of the Mobile IP protocol. When Mobile Node 6 engages with network segment 14, Foreign Agent 10 relays a registration request to Home Agent 8 (as indicated by the dotted line "Registration"). The Home and Foreign Agents may then negotiate the conditions of the Mobile Node's attachment to Foreign Agent 10. For example, the attachment may be limited to a period of time, such as two hours. When the negotiation is successfully completed, Home Agent 8 updates an internal "mobility binding table" which specifies the care-of address (e.g., a collocated care-of address or the Foreign Agent's IP address) in association with the identity of Mobile Node 6. Further, the Foreign Agent 10 updates an internal "visitor table" which specifies the Mobile Node address, Home Agent address, etc. In effect, the Mobile Node's home base IP address (associated with segment 12) has been shifted to the Foreign Agent's IP address (associated with segment 14).

Now, suppose that Mobile Node 6 wishes to send a message to a corresponding node 18 from its new location. A message from the Mobile Node is then packetized and forwarded through Foreign Agent 10 over the internet 4 and to corresponding node 18 (as indicated by the dotted line "packet from MN") according to a standard internet protocol. If corresponding node 18 wishes to send a message to Mobile Node—whether in reply to a message from the Mobile Node or for any other reason—it addresses that message to the IP address of Mobile Node 6 on sub-network 12. The packets of that message are then forwarded over the internet 4 and to router R1 and ultimately to Home Agent 8 as indicated by the dotted line ("packet to MN(1)"). From its mobility binding table, Home Agent 8 recognizes that Mobile Node 6 is no longer attached to network segment 12. It then encapsulates the packets from corresponding node 18 (which are addressed to Mobile Node 6 on network segment 12) according to a Mobile IP protocol and forwards these encapsulated packets to a "care of" address for Mobile Node 6 as shown by the dotted line ("packet to MN(2)"). The care-of address may be, for example, the IP address of Foreign Agent 10. Foreign Agent 10 then strips the encapsulation and forwards the message to Mobile Node 6 on sub-network 14. The packet forwarding mechanism implemented by the Home and Foreign Agents is often referred to as "tunneling."

In addition to providing connectivity to a mobile node, it may be desirable to provide for the mobility of one or more networks moving together, such as on an airplane or a ship. RFC 2002 section 4.5 discusses the possibility of implementing mobile routers.

In one approach suggested in RFC 2002 section 4.5, a Home Agent is configured to have a permanent registration for each fixed node. FIG. 1B is a diagram of a Mobile IP mobile router and associated environment in which a Home Agent is configured to have a permanent registration for each fixed node. As shown, a mobile router 20 may support multiple nodes 22, 24, 26 which may be fixed with respect to the mobile router 20. In order to receive communication from a corresponding node 28, messages must be routed to the appropriate fixed node 22, 24, or 26. As the RFC suggests, a Home Agent 30 may be configured to have a permanent registration for each fixed node. By way of example, the permanent registration may indicate the mobile router's address as the care-of address. Thus, a separate mapping table may associate the IP address of each of the fixed nodes 22, 24, and 26 with the mobile router 20.

However, this is problematic since the mapping table is typically configured while the mobile router 20 is coupled to the Home Agent 30. In other words, the routing table is static. Suppose a person boards an airplane and wishes to connect a laptop to the airplane's "mobile network" via the mobile router 20. If a new node 32 is added to the mobile router 20 after the airplane leaves the airport, the IP address of this new node may not be added to the mapping table. As a result, communication cannot be received by this new node 32 via the mobile router 20. In addition, since the mobile router 20 may accommodate thousands of devices, or nodes, there would potentially be an enormous number of entries to store in such a mapping table for these nodes. Moreover, such a mapping table may include entries for multiple mobile routers. Accordingly, such a mapping table would consume a substantial amount of memory as well as be cumbersome to search.

In another approach suggested in RFC 2002, the mobile router 20 may advertise connectivity to the entire "mobile network." FIG. 1C is a diagram of a Mobile IP mobile router and associated environment in which the mobile router advertises 34 connectivity to each node associated with the mobile router. The RFC states that this may be performed using normal IP routing protocols through a bi-directional tunnel to its Home Agent 30. However, the RFC provides no implementation details.

In view of the above, it would be desirable to have improved techniques for implementing a Mobile IP mobile router.

SUMMARY OF THE INVENTION

Methods and apparatus for providing Mobile IP mobile router functionality are provided. This is accomplished through identifying networks associated with the mobile router which may then be used to update the appropriate tables. Thus, the Home Agent does not need to separately track each node associated with the mobile router.

In accordance with one aspect of the invention, the Home Agent receives a registration request packet. The registration request packet may include a care-of address for the mobile router. Networks associated with the mobile router are then identified. The Home Agent then updates a routing table to associate the identified networks with the care-of address. In addition, the Home Agent updates a mobility binding table with the care-of address for the mobile router.

In accordance with another aspect of the invention, at least one network linked to the mobile router is listed in an extension appended to the registration request. Upon receipt of such request, the Home Agent identifies networks associated with the mobile router from the extension. The Home Agent then updates a routing table to associate the care-of address with the identified networks and updates a mobility binding table with the care-of address. In addition, the Foreign Agent may update a visitor table with an entry for each of the networks listed on the extension to associate those networks with the mobile router.

In accordance with yet another aspect of the invention, routing information is exchanged between the Home Agent and the mobile router. A routing table associated with at least one of the Home Agent and the mobile router is updated as appropriate to include the exchanged routing information. By way of example, networks associated with the mobile router may be obtained from the exchanged routing information and the appropriate routing tables may be updated to associate the networks with the care-of address for the mobile router. In addition, the Home Agent updates its mobility binding table with the care-of address. If the care-of address is the address of a Foreign Agent, a visitor table may be updated to associate the networks with the mobile router.

BRIEF DESCRIPTION OF THE DRAWINGS

FIG. 2A-2 is a diagram illustrating an exemplary mapping table that may be used by an active Home Agent in accordance with an embodiment of the invention.

FIG. 2A-3 is a diagram illustrating an exemplary routing table that may be used by an active Home Agent when the mobile router is at the Home Agent in accordance with an embodiment of the invention.

FIG. 2A-4 is a diagram illustrating a Mobile IP mobile router and associated environment when the mobile router is roaming according to a first embodiment of the invention.

FIG. 2B-1 is a diagram illustrating an exemplary mobility binding table associated with a first Foreign Agent that may be used by an active Home Agent in accordance with an embodiment of the invention.

FIG. 2B-2 is a diagram illustrating exemplary routing and interface tables associated with a first Foreign Agent that may be used by an active Home Agent in accordance with an embodiment of the invention.

FIG. 2B-3 is a diagram illustrating exemplary routing and interface tables associated with a collocated care-of address that may be used by an active Home Agent in accordance with an embodiment of the invention.

FIG. 2C-1 is a diagram illustrating an exemplary mobility binding table associated with a second Foreign Agent that may be used by an active Home Agent in accordance with an embodiment of the invention.

FIG. 2C-2 is a diagram illustrating exemplary routing and interface tables associated with a second Foreign Agent that may be used by an active Home Agent in accordance with an embodiment of the invention.

FIG. 4 is a diagram illustrating a Mobile IP mobile router and associated environment in which a Home Agent may install routes to mobile networks specified in a registration request according to a second embodiment of the invention.

DETAILED DESCRIPTION OF THE INVENTION

Figure 1A:
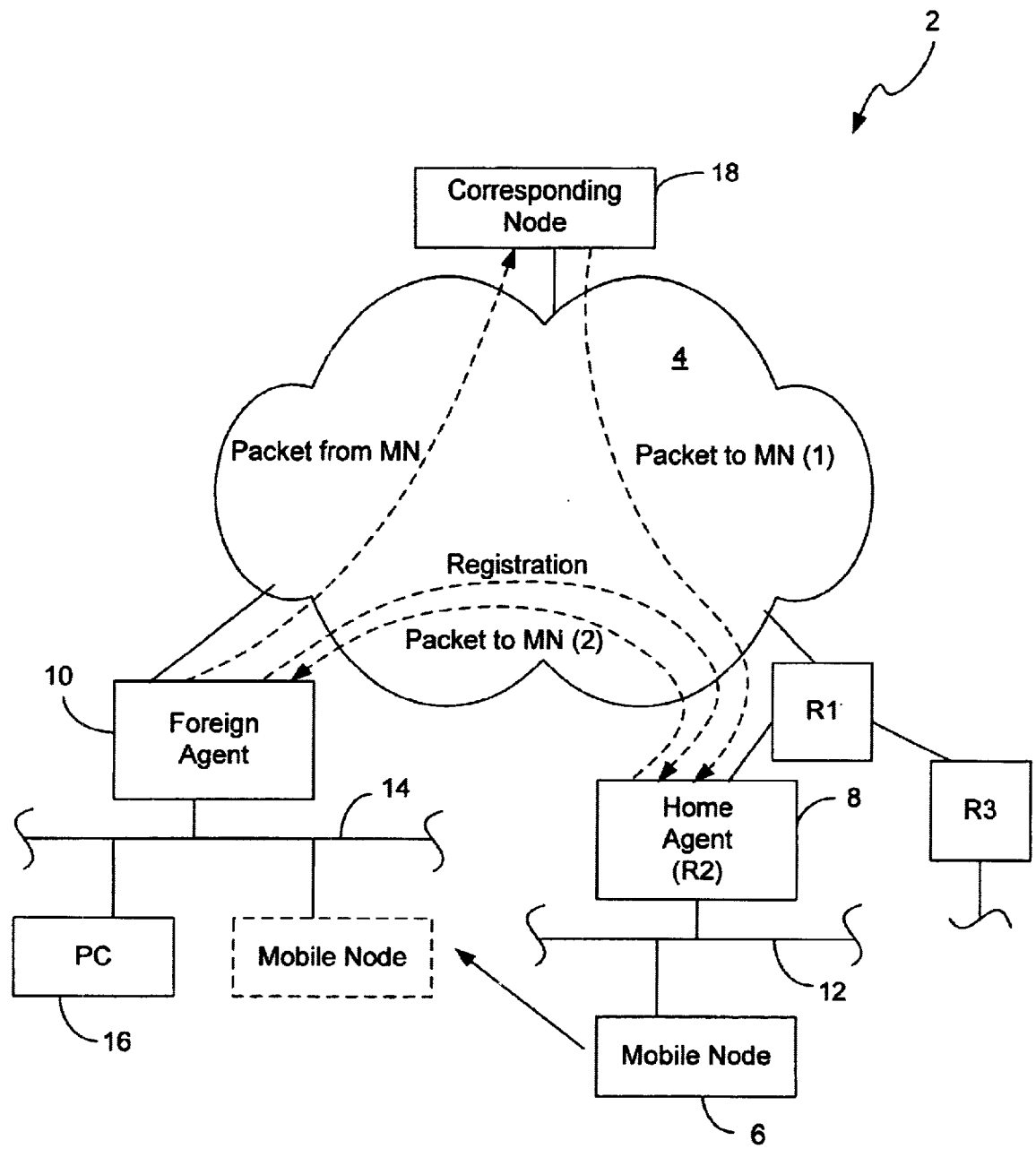
FIG. 1A is a diagram of a Mobile IP network segment and associated environment.
Figure 1B:
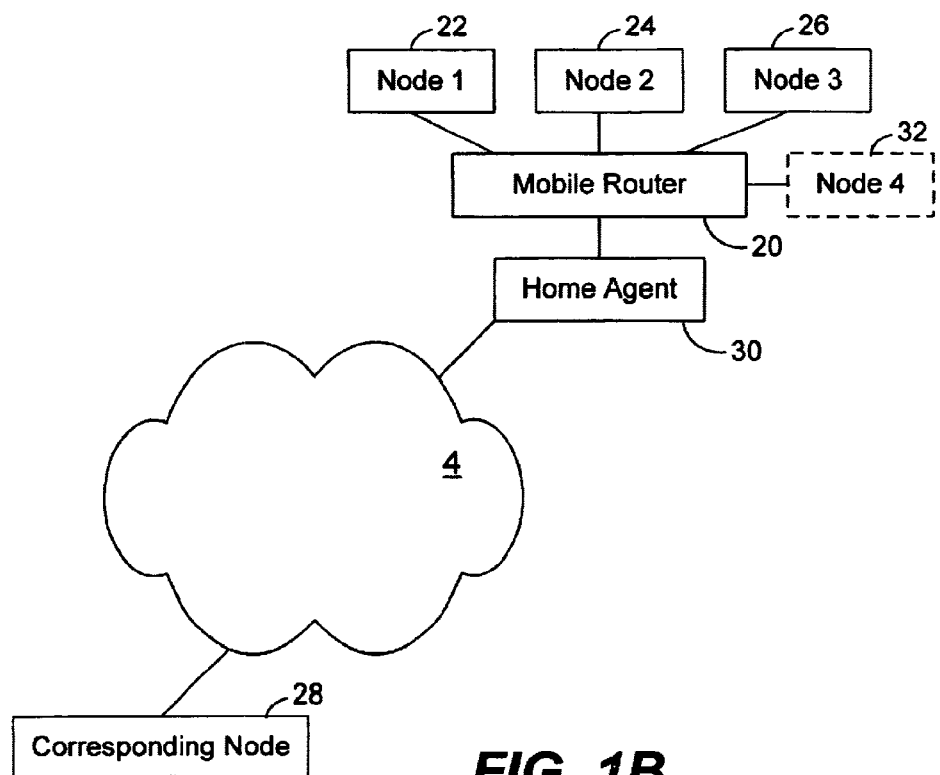
FIG. 1B is a diagram of a Mobile IP mobile router and associated environment in which a Home Agent is configured to have a permanent registration for each fixed node that indicates the mobile router's address as the care-of address.
Figure 1C:
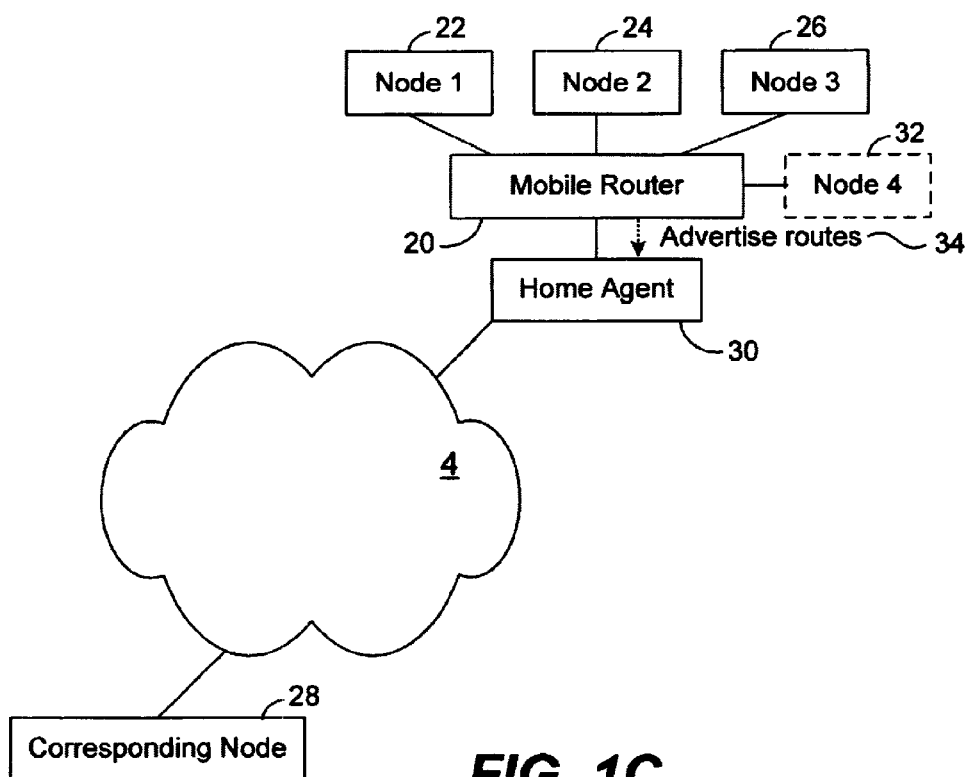
FIG. 1C is a diagram of a Mobile IP mobile router and associated environment in which the mobile router advertises connectivity to each mobile network associated with the mobile router.

In the following description, numerous specific details are set forth in order to provide a thorough understanding of the present invention. It will be apparent, however, to one skilled in the art, that the present invention may be practiced without some or all of these specific details. In other instances, well known process steps have not been described in detail in order not to unnecessarily obscure the present invention.

An invention is described herein which provides Mobile IP mobile router functionality. When a mobile router moves to a new geographical location, it constructs a registration request and registers with its Home Agent via a care-of address. Upon receipt of the registration request, the Home Agent verifies authentication of the registration request packet and updates the appropriate tables. Registration is performed once for the mobile router. From the registration packet and sometimes from information easily accessible to the Home Agent, the Home agent registers the care-of address for the network(s) serviced by the mobile router. This eliminates the necessity for the Home Agent to separately track each node associated with the mobile router.

In accordance with one embodiment, the Home Agent receives a registration request when the mobile router moves to a new location. It then identifies networks associated with the mobile router from a local static mapping table. The Home Agent then updates its routing table to associate the care-of address with the networks. In addition, the Home Agent updates a mobility binding table with the care-of address for the mobile router.

In accordance with another embodiment, networks associated with the mobile router are listed in an extension appended to the registration request. Upon receipt of such request, the Home Agent then updates its routing table to associate the care-of address with the networks and updates its mobility binding table with the care-of address, as described above. In addition, the Foreign Agent updates a visitor table with an entry for each of the networks listed on the extension to associate those networks with the mobile router. The foreign agent will thus recognize the destination of packets addressed to nodes on the mobile router's networks.

In accordance with yet another embodiment, routing information is exchanged between the Home and the mobile router via an IP routing protocol via a bi-directional tunnel. A routing table associated with at least one of the Home Agent and the mobile router is updated as appropriate for the particular routing protocol. Networks associated with the mobile router are obtained from the exchanged routing information and the appropriate routing tables are updated to associate the networks with the care-of address. In addition, the Home Agent updates its mobility binding table with the care-of address. If the care-of address is the address of a Foreign Agent, a visitor table may be updated to associate the networks with the mobile router.

Figures 1, 2A:
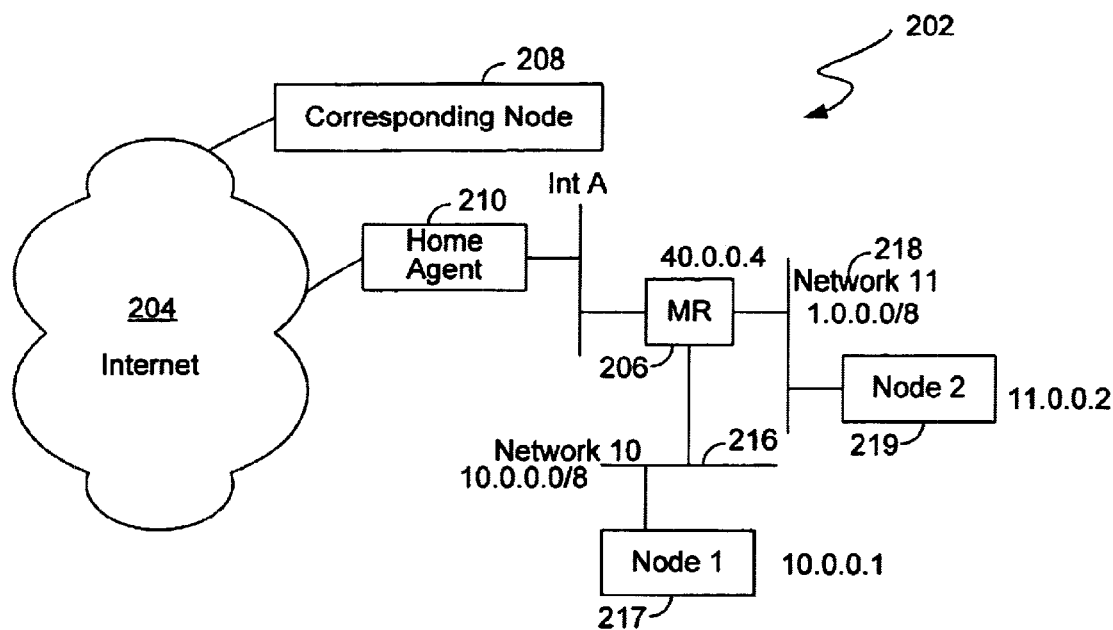
FIG. 2A-1 is a diagram illustrating a Mobile IP mobile router and associated environment in which the mobile router is stationed at the Home Agent.

FIG. 2A-1 is a diagram illustrating a Mobile IP mobile router and associated environment in which the mobile router is stationed at the Home Agent. As shown, a Mobile IP environment 202 includes the internet (or a WAN) 204 over which a node such as "node 1" 217 connected to mobile router 206 can communicate remotely with a corresponding node 208 via mediation by a Home Agent 210 and a Foreign Agent. By way of example, the Home Agent 210 and the Foreign Agent may be network devices such as routers or hosts having Mobile IP capabilities. The mobile router may include Mobile IP software. The mobile router 206 may provide connectivity to multiple networks, many or all of which may roam with mobile router 206. As shown, the mobile router 206 provides connectivity to a first mobile network, "network 10" 216, and a second network, "network 11" 218. Although only one network, "network 10" 216, in the following examples is mobile, other networks such as the second network, "network 11" 218, may be mobile networks.

Each network and network device is assigned a unique IP address. IP addresses typically include a network-prefix portion and a host portion. By way of example, the network-prefix may consist of the leftmost 8 bits and the host portion may consist of the rightmost 24 bits. Exemplary IP addresses are provided, as shown. The Home Agent 210 has an IP address 40.0.0.1, the mobile router has an IP address 40.0.0.4, the first network 216 has an IP address 10.0.0.0/8 and the second network has an IP address 11.0.0.0/8. A 32-bit mask may be used to specify the entire IP address (e.g., 40.0.0.4/32). Alternatively, a mask may be used to exclude the rightmost 24 bits of the network addresses that are associated with the mobile router supported networks, as shown. In this manner, the network portion of the IP addresses may be used in routing decisions to route packets to nodes 217 and 219, identified by IP addresses 10.0.0.1 and 11.0.0.2, respectively.

Figures 2, 2A:
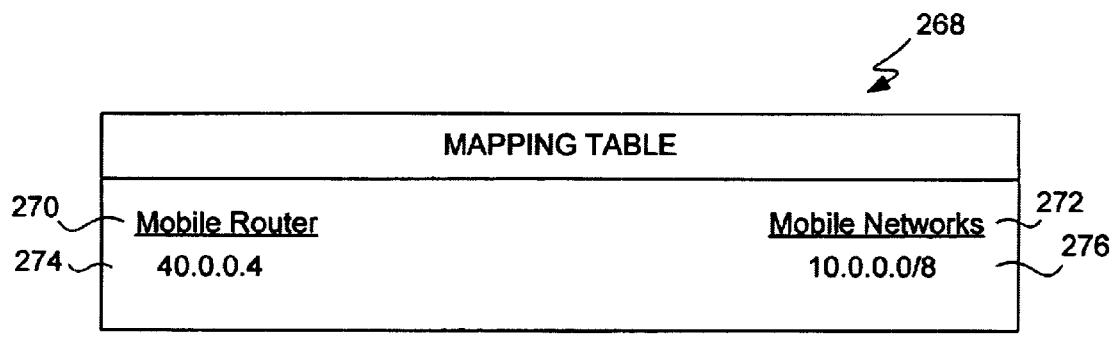

A Home Agent may be configured to include a mapping of mobile networks associated with the mobile router. For this purpose, a mapping table may be used to associate the mobile router with one or more networks. FIG. 2A-2 is a diagram illustrating an exemplary mapping table that may be used by an active Home Agent in accordance with an embodiment of the invention. As shown, mapping table 268 associates each mobile router 270 with associated mobile networks 272. As shown, the mobile router 274 may be designated by its IP address, 40.0.0.4. The mobile router 274 is associated with the first network 276, network 10, which may be designated its IP address, 10.0.0.0/8. In one embodiment, mapping table 268 is static and may be updated by an administrator.

Figures 2, 2A, 3:
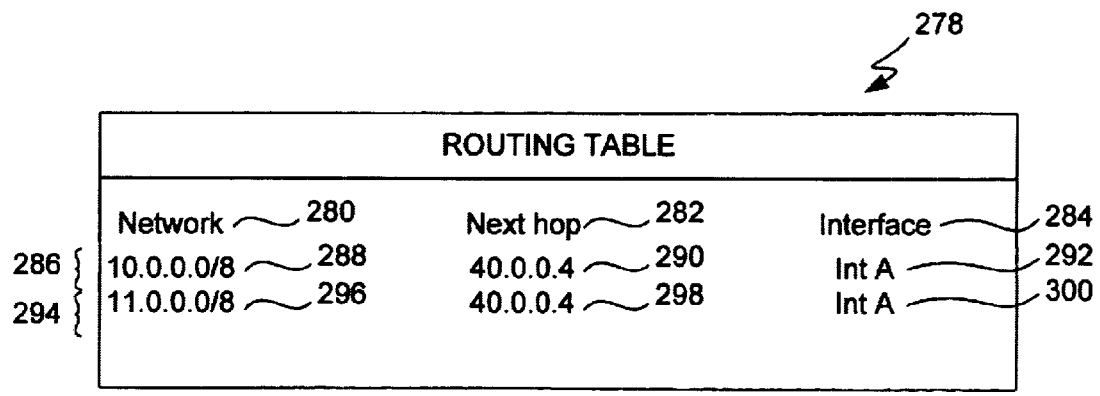

FIG. 2A-3 is a diagram illustrating an exemplary routing table that may be used by an active Home Agent when the mobile router is stationed at the Home Agent in accordance with an embodiment of the invention. Routing table 278 associated with the Home Agent includes an entry for one or more networks that are coupled to the mobile router. As shown, each entry in the routing table 278 may include a care-of address associated with the networks that are coupled to the mobile router. As shown, each entry may include a network IP address 280, a next hop router IP address to the care-of address for the network 282, and an interface 284. As shown, a first entry 286 may include an IP address for the first network 288, 10.0.0.0/8, the IP address of the mobile router 290, 40.0.0.4, and an interface 292, IntA. Similarly, a second entry 294 may include an IP address for the second network 296, 11.0.0.0/8, the IP address of the mobile router 298, 40.0.0.4, and an interface 300, IntA.

FIG. 2A-4 is a diagram illustrating a Mobile IP mobile router and associated environment when the mobile router is roaming according to a first embodiment of the invention. As shown, the mobile router may be linked to a first available Foreign Agent 212. As the mobile router roams, it may then communicate through a second available Foreign Agent 214 at another geographical location. As described above, the mobile router 206 may provide connectivity to multiple networks, many or all of which may roam with mobile router 206. Although only one network, "network 10" 216, is shown to be mobile, other networks may be mobile networks. Exemplary IP addresses are provided, as shown. The Home Agent 210 has an IP address 40.0.0.1, the first Foreign Agent 212 has an IP address 20.0.0.2, the second Foreign Agent 214 has an IP address 31.0.0.3, the mobile router has an IP address 40.0.0.4, the first network 216 has an IP address 10.0.0.0/8 and the second network has an IP address 11.0.0.0/8.

In order to provide for connectivity to multiple networks, the Home Agent may have a mobility binding table, a routing table, and a mobile router/network mapping table available for its use. The mapping table may be used to associate the mobile router with one or more networks. Since the networks associated with the mobile router are typically configured at the time that the mobile router is connected to the Home Agent, the mapping table may be static during registration of the mobile router. The routing table and the mobility binding table may then be used to associate a care-of address with the mobile router and the networks. Specifically, the routing table associates each one of the networks with a care-of address through a tunnel interface to the mobile router. Similarly, the mobility binding table associates the mobile router with the care-of address.

Figures 2, 2A, 3, 4:
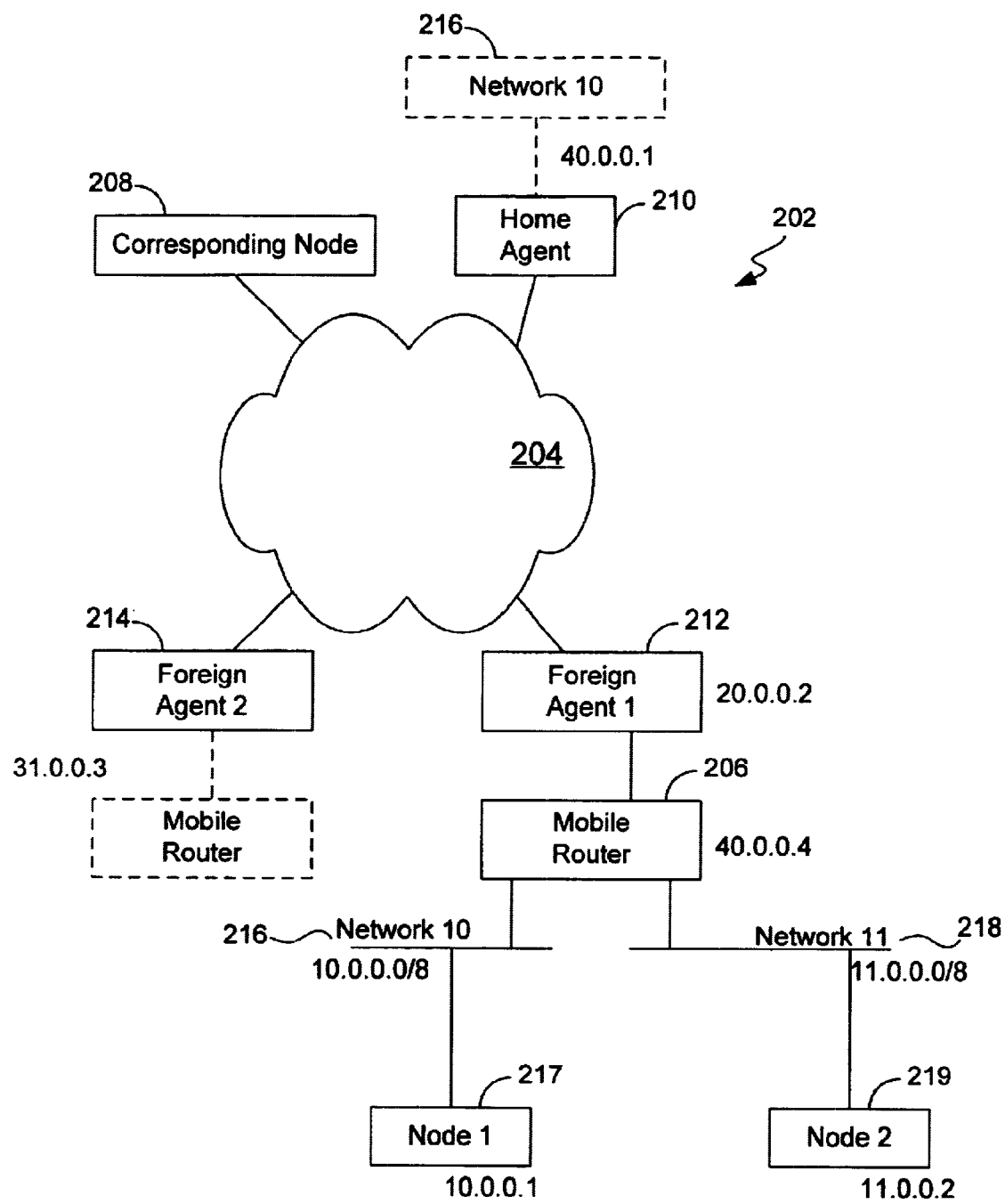
Figures 1, 2B:
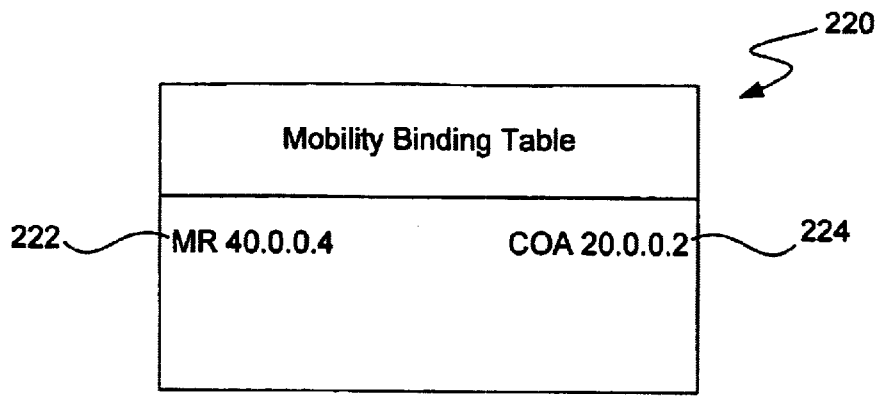
Figures 2, 2B:
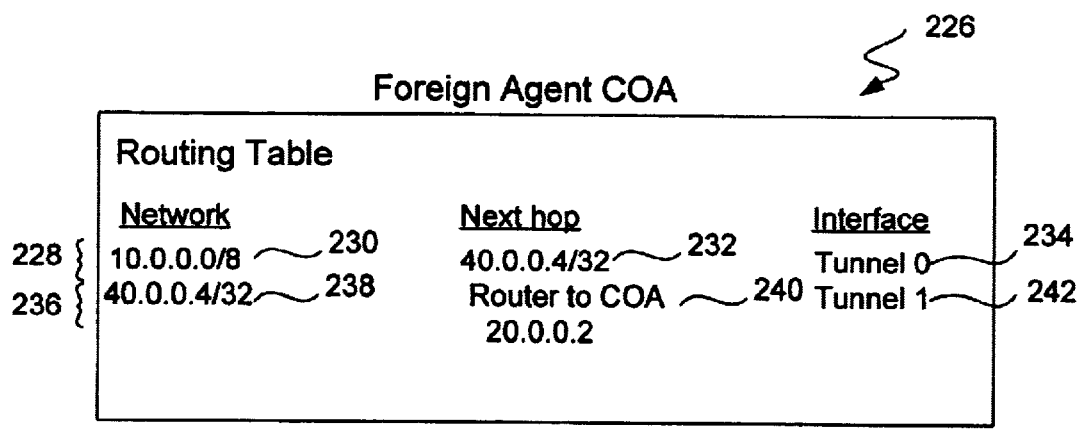
Figures 2, 2B, 3:
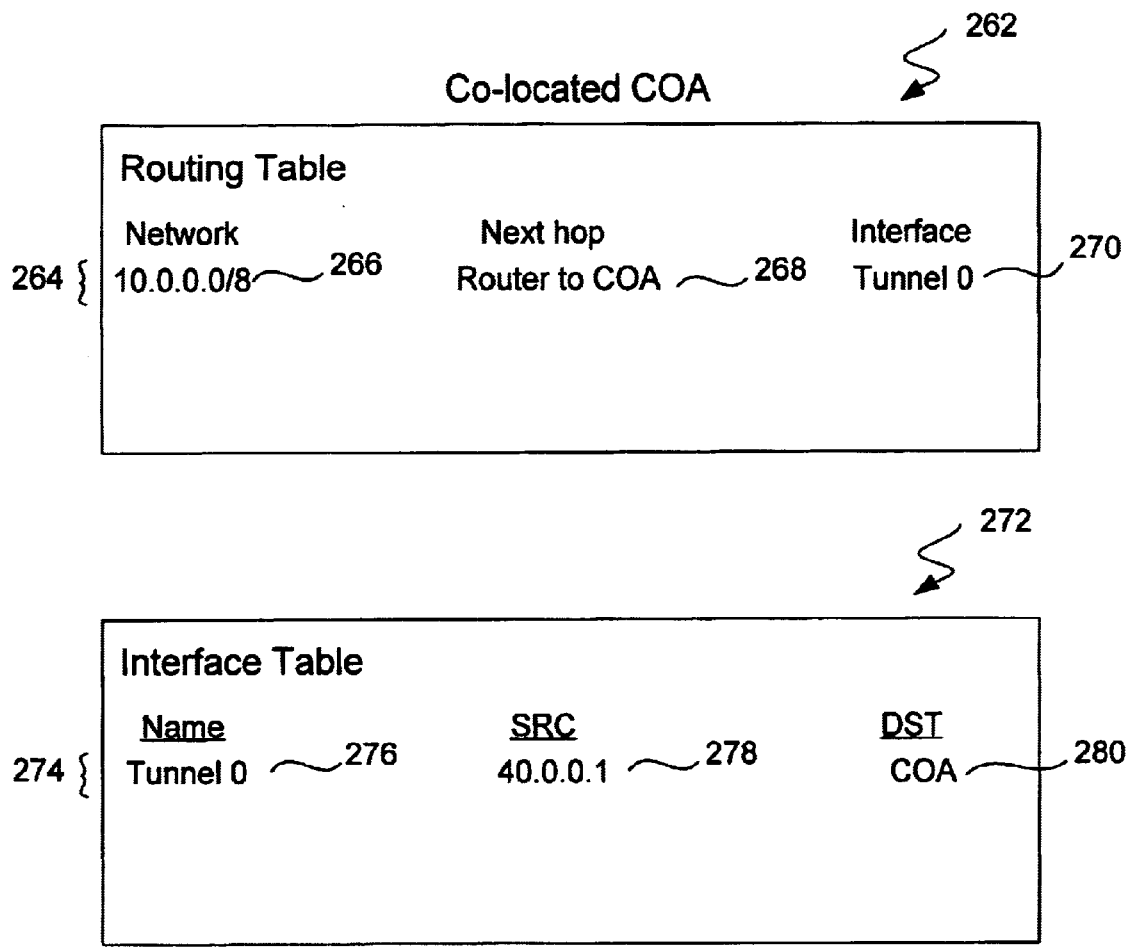

Exemplary mobility binding, routing tables, and interface table associated with a first Foreign Agent that may be used by an active Home Agent in accordance with an embodiment of the invention are illustrated in FIGS. 2B-1, 2B-2, and 2B-3. As shown in FIG. 2B-1, mobility binding table 220 associates mobile router 222 with care-of address 224. The care-of address 224 may be a foreign agent address as well as a collocated care-of address. In this example, the care-of address 224 is the IP address of the first Foreign Agent, 20.0.0.2. As shown, the mobile router 222 may be designated by its IP address, 40.0.0.4. In addition, the mobility binding table 220 may include a tunnel interface (not shown to simplify illustration). Moreover, the mobility binding table 220 may include care-of address associations for additional mobile routers (and other mobile nodes) based with the same Home Agent. Such additional mobile routers/nodes may be linked to the first Foreign Agent or any other Foreign Agent that has registered a Mobile IP connection.

In addition, a routing table is used to route packets to each mobile router supported network. Routing tables typically include a target field, a next hop field, and an interface field. When a node has an IP packet to forward, it searches its routing table for an entry whose target field matches the IP destination address in the packet header of the packet being forwarded. If it finds a matching entry, the node forwards the packet to the node identified by the next hop field in that entry via the link specified in the interface field of that entry.

FIG. 2B-2 is a diagram illustrating exemplary routing and interface tables associated with a first Foreign Agent that may be used by an active Home Agent in accordance with an embodiment of the invention. As shown in FIG. 2B-2, routing table 226 containing entries for the first Foreign Agent and associated with the Home Agent includes an entry for each of the mobile networks that are coupled to the mobile router. Each entry in the routing table 226 may include a care-of address associated with the one or more networks. As shown, a first entry 228 may include an IP address for the first network 230, 10.0.0.0/8, IP address of the next hop router to the care-of address for the first network 232, 40.0.0.4, and an interface 234, tunnel 0. Thus, the interface will provide an identifier of the tunnel created during registration. A second entry 236 may include the router IP address 238, 40.0.0.4, a next hop router IP address to the care-of address 240, 20.0.0.2, and an interface 242, tunnel 1. Because routing table 226 may contain IP addresses and care-of addresses for the one or more networks associated with the mobile router, packets addressed to nodes on these networks are identified by the Home Agent and tunneled to the care-of addresses.

Interface table 244 may include a first entry 246 providing the tunnel name of the interface 248, tunnel 0, the source address of tunnel 0 250, 40.0.0.1, and the destination address of tunnel 0 252, 40.0.0.4. Similarly, a second entry 254 may provide the tunnel name of the interface 256, tunnel 1, the source address of tunnel 1 258, 40.0.0.1, and the destination address of tunnel 1 260, 20.0.0.2. Thus, the source address of the tunnels is the Home Agent interface 40.0.0.1.

FIG. 2B-3 is a diagram illustrating exemplary routing and interface tables associated with a collocated care-of address that may be used by an active Home Agent in accordance with an embodiment of the invention. As shown in FIG. 2B-3, routing table 262 may include a care-of address associated with one or more networks. As shown, an entry 264 may include an IP address for the first network 266, 10.0.0.0/8, a next hop router IP address to the care-of address for the first network 268, and an interface 270, tunnel 0. Thus, the interface will provide an identifier of the tunnel created during registration.

In addition to a routing table, an interface table may be provided. Interface table 272 may include an entry 274 providing the tunnel name of the interface 276, tunnel 0, the source address of tunnel 0 278, 40.0.0.1, and the destination address of tunnel 0 280, the care-of address.

Figures 1, 2C:
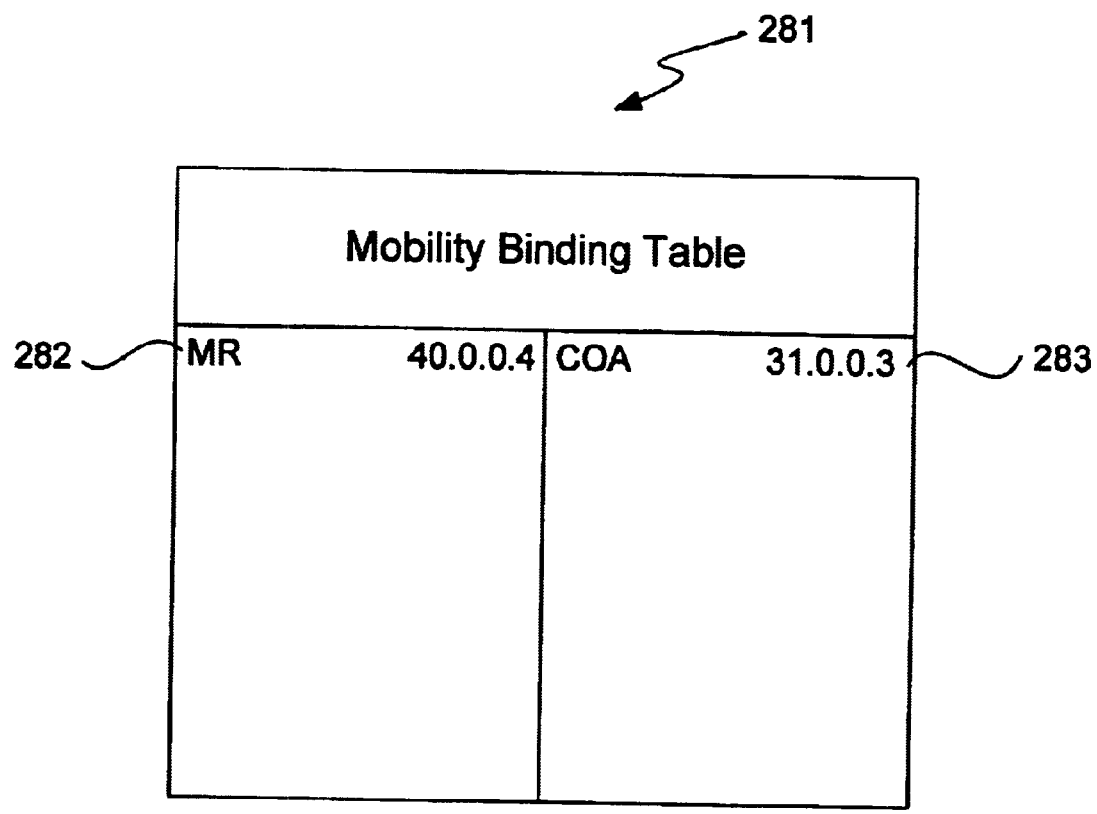
Figures 2, 2C:
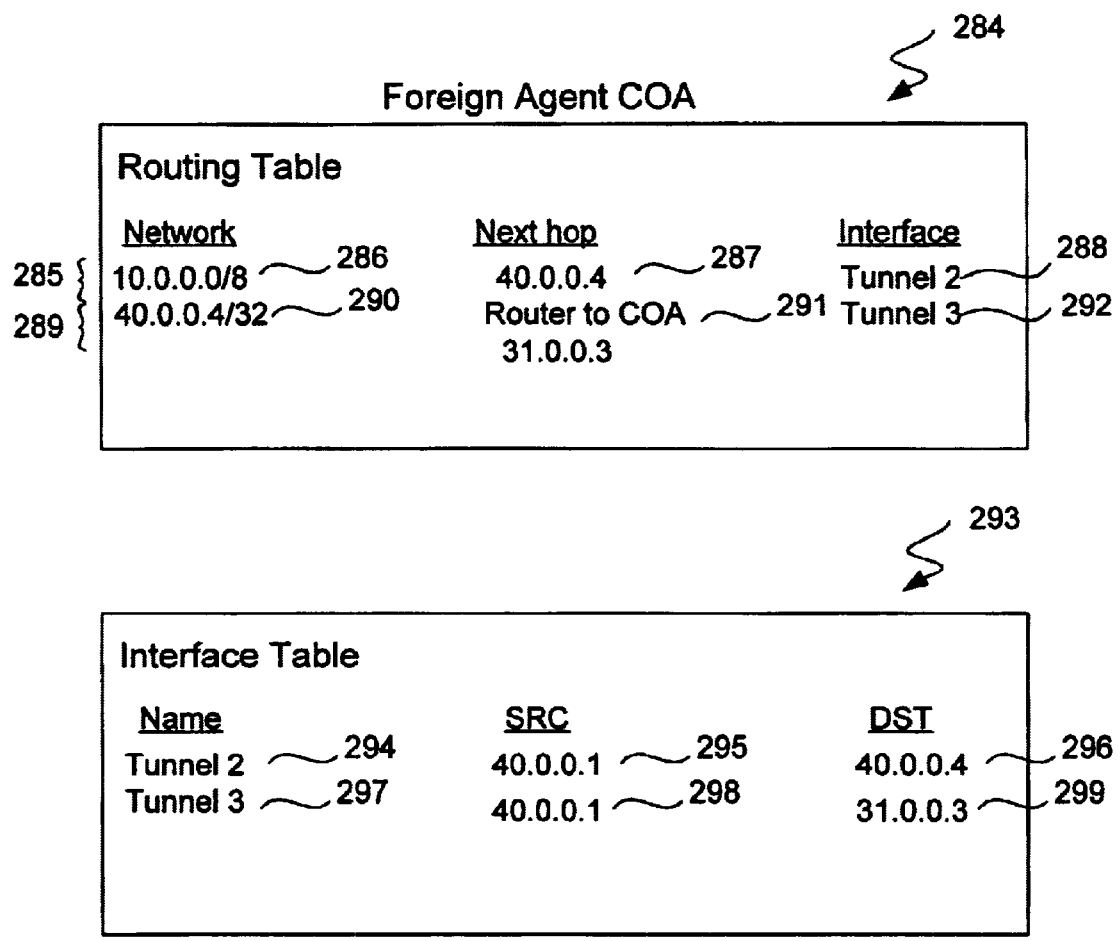

FIGS. 2B-1 through 2C-2 may be snapshots of the routing, mobility, and interface tables taken at different times (as the mobile router roams between Foreign Agents). FIG. 2C-1 is a diagram illustrating an exemplary mobility binding table associated with a second Foreign Agent that may be used by an active Home Agent in accordance with an embodiment of the invention. As shown, mobility binding table 281 associates mobile router 282 with its care-of address 283. In this example, the care-of address 283 is the IP address of the second Foreign Agent, 31.0.0.3. In addition, the mobile router 282 may be designated by its IP address, 40.0.0.4. Moreover, the mobility binding table 244 may include care-of address associations for one or more mobile routers that are linked to the second Foreign Agent.

FIG. 2C-2 is a diagram illustrating exemplary routing and interface tables associated with a second Foreign Agent that may be used by an active Home Agent in accordance with an embodiment of the invention. As shown in FIG. 2B-2, routing table 284 containing entries for the second Foreign Agent and associated with the Home Agent includes an entry for each of the one or more networks that are coupled to the mobile router. Each entry in the routing table 284 may include a care-of address associated with the one or more networks. As shown, a first entry 285 may include an IP address for the first network 286, 10.0.0.0/8, a next hop router IP address to the care-of address for the first network 287, 40.0.0.4, and an interface 288, tunnel 2. A second entry 289 may include the router IP address 290, 40.0.0.4/32, a next hop router IP address to the care-of address 291, 31.0.0.3, and an interface 292, tunnel 3. Thus, the one or more networks may be designated by a corresponding IP address.

Interface table 293 may include a first entry providing the tunnel name of the interface 294, tunnel 2, the source address of tunnel 2 295, 40.0.0.1, and the destination address of tunnel 2 296, 40.0.0.4. Similarly, a second entry may provide the tunnel name of the interface 297, tunnel 3, the source address of tunnel 3 298, 40.0.0.1, and the destination address of tunnel 3 299, 31.0.0.3. Thus, the source address of the tunnels is the Home Agent interface 40.0.0.1.

Figure 3A:
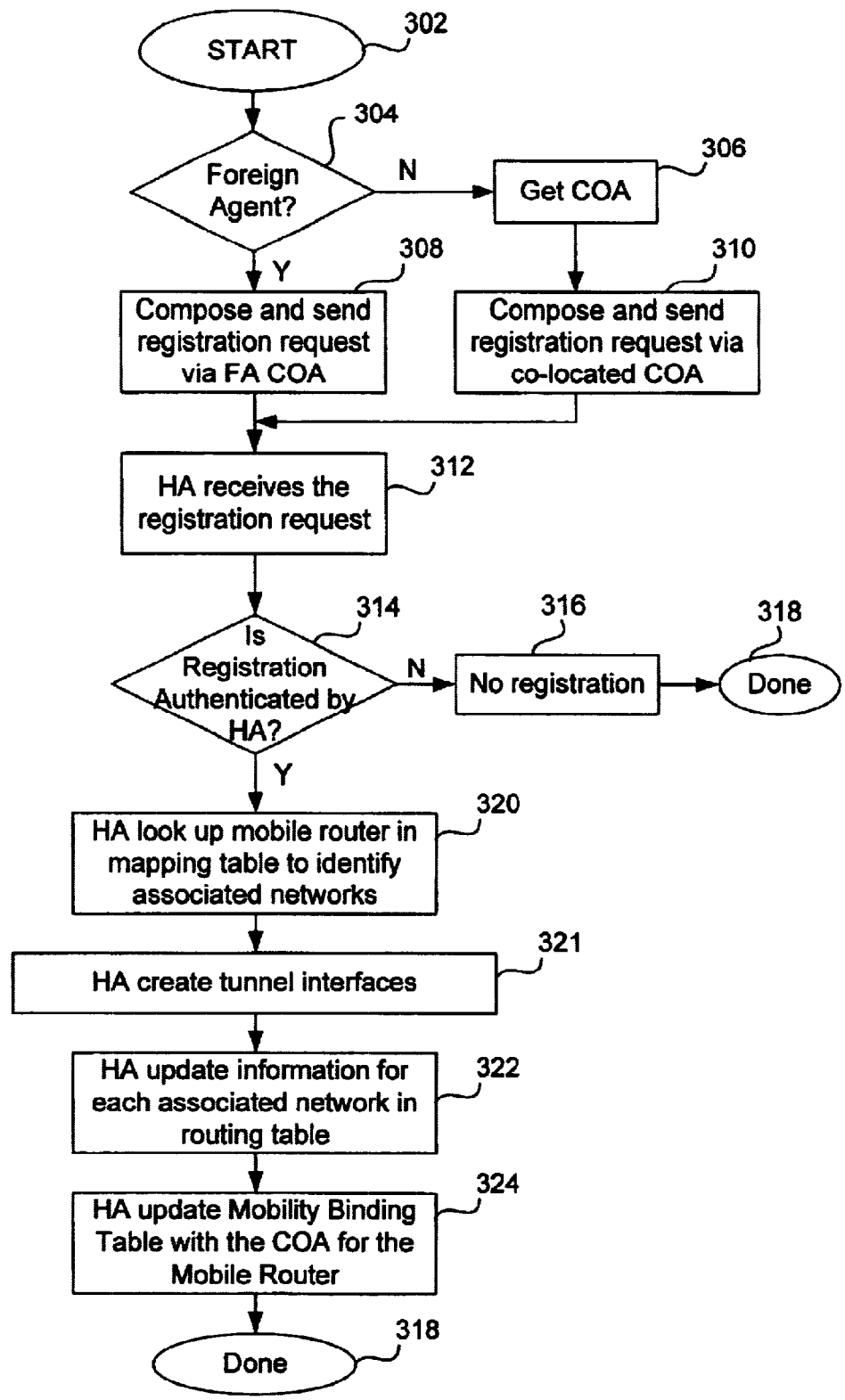
FIG. 3A is a process flow diagram illustrating the steps performed by a Home Agent and a Foreign Agent to provide mobile router functionality in accordance with the first embodiment of the invention.

FIG. 3A is a process flow diagram illustrating the steps performed by a Home Agent and a Foreign Agent to provide mobile router functionality in accordance with the first embodiment of the invention. As shown, the registration process begins at step 302 and at step 304 the process flow diverges depending upon whether the mobile router connects through a foreign agent. If there is no foreign agent, a collocated care-of address is obtained at step 306. A collocated care-of address is an IP address temporarily assigned to an interface of the mobile node itself, or mobile router in this instance. Thus, the careof address may be an IP address associated with the mobile router. In other words, through the use of a collocated care-of address, packets may be tunneled directly to the mobile router.

Once the care-of address has been obtained, a registration request is composed and sent via the care-of address. If there is a foreign agent, the registration request is composed and sent via the foreign agent care-of address at step 308. Alternatively, after the collocated care-of address is obtained at step 306, the registration request is composed and sent via the collocated care-of address at step 310.

Once the registration request is sent (via Foreign Agent care-of address or collocated care-of address), it is received by the Home Agent at step 312. The registration request comprises a registration request packet that includes the care-of address for the mobile router. Next, at step 314, it is determined whether the registration is authenticated by the Home Agent, as provided by RFC 2002 for example. At step 316, if the registration is not authenticated, the mobile router is not registered with the Home Agent and the process is complete as indicated at step 318.

If the registration is authenticated, registration is completed by the Home Agent in steps 320 through 324. At step 320, networks associated with the mobile router are identified. According to the first embodiment, the networks associated with the mobile router are obtained from a mobile router/network mapping table such as that illustrated in FIG. 2A-2. Tunnel interfaces to reach the mobile router may then be created at step 321. At step 322, a routing table such as that illustrated in FIG. 2B-2 and FIG. 2C-2 is updated to associate the identified networks with the care-of address (obtained from the registration request packet). A mobility table such as that illustrated in FIG. 2B-1 and 2C-1 is similarly updated to include the care-of address for the mobile router at step 324. As described above, the care-of address may be an IP address of a Foreign Agent or a collocated care-of address. The process flow then ends at step 318.

The first embodiment provides significant advantages over the mobile router implementations suggested by the RFC. For instance, since the routing table contains networks associated with the mobile router rather than all nodes, this implementation is scalable for many fixed nodes associated with these networks. In addition, the registration request packet format need not be altered.

Figure 3B:
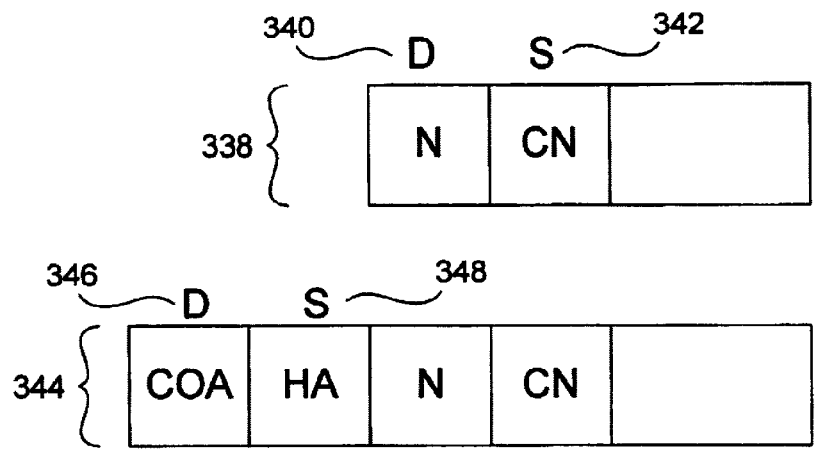
FIG. 3B is a diagram illustrating packet header encapsulation typically performed when a packet is sent to a mobile node from a corresponding node.

Although the first embodiment provides certain advantages, this embodiment may require recursive tunneling if used with a Foreign Agent, as will be described with reference to FIG. 3B and FIG. 3C. Typically, when a packet is sent to a mobile node from a corresponding node, the packet is encapsulated twice. FIG. 3B is a diagram illustrating such two-level encapsulation. The packet is encapsulated in a first step when the packet is sent from the corresponding node to the Home Agent and in a second step when it is forwarded from the Home Agent to the care-of address (e.g., Foreign Agent). The first step typically involves applying the standard header used for most all IP packets. As shown, in the first encapsulation step, a packet header 338 having a destination field 340 specifying the node N and a source field 342 specifying the corresponding node CN is created. The packet is then sent from the corresponding node CN to the Home Agent. When the packet is received by the Home Agent, a second encapsulation step is performed. The second step involves applying the basic Mobile IP header to the packet (as specified in RFC 2002). As shown, a second packet header 344 having a destination field 346 specifying the care-of address for the mobile node and a source field 348 specifying the Home Agent is formed. Thus, the second level of encapsulation serves to direct (tunnel) the packet from the Home Agent to the Foreign Agent. When the Foreign Agent receives the tunneled packet, it strips off the second layer of encapsulation and forwards the packet to the address provided in the first level of encapsulation. To accomplish this, the Foreign Agent may consult its visitor table, which lists the addresses of all Mobile IP nodes that it is now servicing.

In order to implement a mobile router, an extra layer of encapsulation is required from the Home Agent to the mobile router. In the two-level encapsulation just described, the Foreign Agent will not forward the packet destined to the mobile network to the mobile router. During registration, the Foreign Agent received a registration request packet from the mobile router. It then updates its visitors table to identify the mobile router. Because the registration request did not list the roaming nodes (only the roaming router), the visitors table did not list the network nodes roaming with the mobile router. Therefore, a third layer of encapsulation is required, to implement "recursive tunneling," so that the Foreign Agent can forward the packets destined to the network nodes to the mobile router.

Figure 3C:
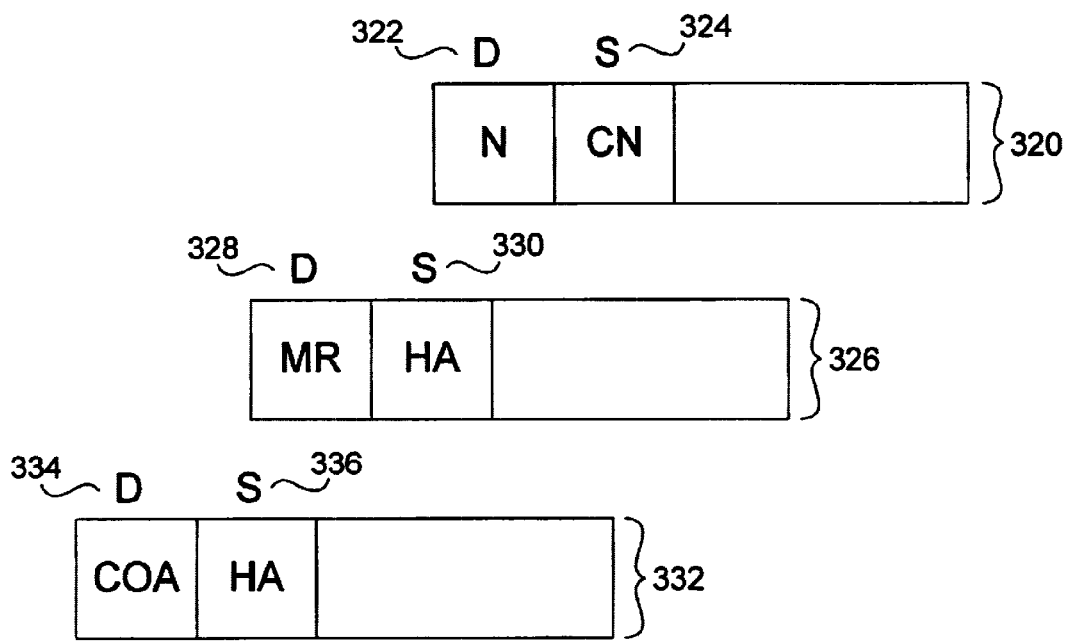
FIG. 3C is a diagram illustrating packet header encapsulation during recursive tunneling that may occur during an embodiment of the invention.
Figure 4:
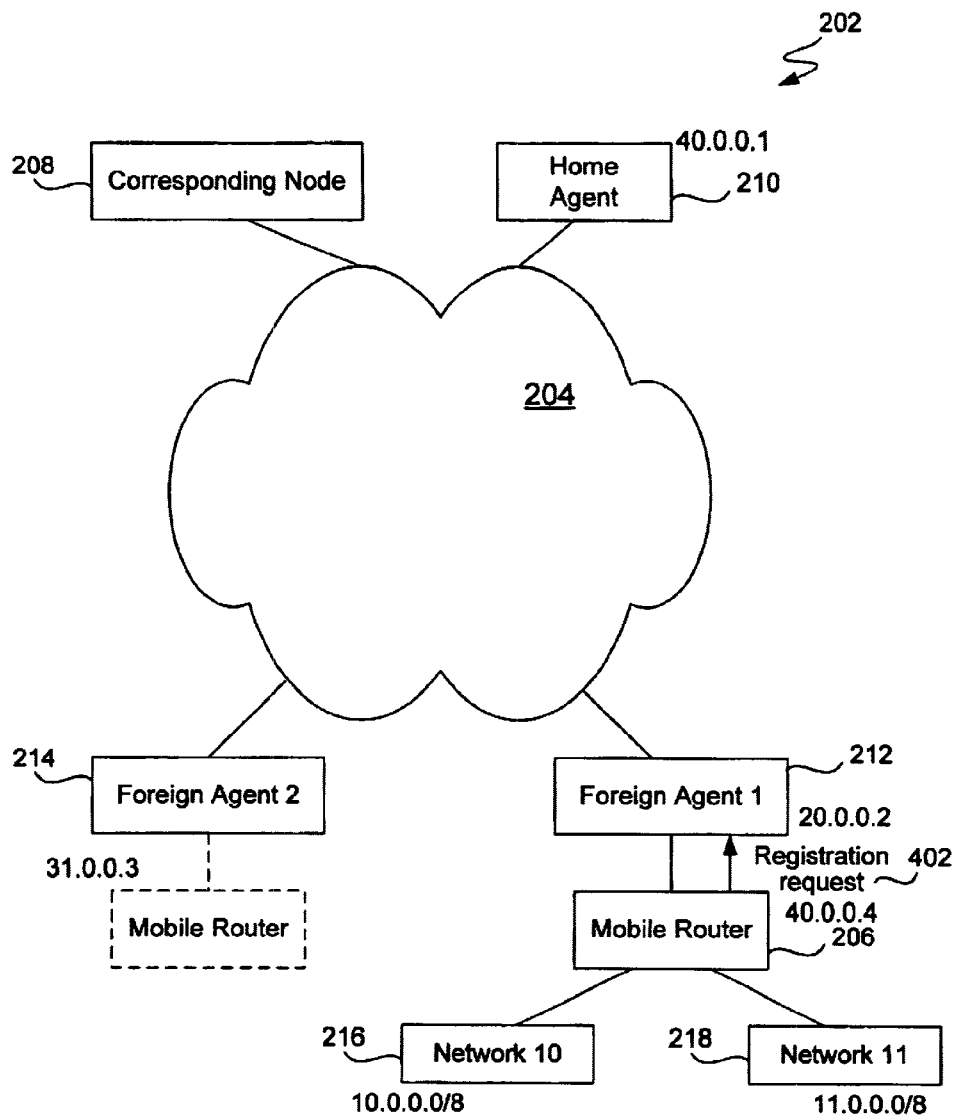

FIG. 3C is a diagram illustrating a packet header encapsulation procedure that may be performed during recursive tunneling. During recursive tunneling, when a packet is forwarded from a corresponding node (CN) to a node (N) linked to the mobile router (MR), there are three encapsulation steps that are applied. In a first encapsulation step, a packet header 320 having a destination field 322 specifying the node N and a source field 324 specifying the corresponding node CN is created. The packet is then sent from the corresponding node CN to the Home Agent. When the packet is received by the Home Agent, two additional levels of encapsulation are provided prior to forwarding of the packet to the mobile router. During a second encapsulation step, a second packet header 326 having a destination field 328 specifying the mobile router MR and a source field 330 specifying the Home Agent is formed. In a third encapsulation step, a third packet header 332 having a destination field 334 specifying a care-of address and a source field 336 specifying the Home Agent is created. Thus, when the packet is forwarded from the Home Agent to the care-of address, an extra encapsulation step is applied.

As described above, registration is accomplished in the first embodiment through the use of a mapping table which contains mobile router supported networks. FIG. 4 is a diagram illustrating a Mobile IP mobile router and associated environment in which a Home Agent may install routes to mobile networks specified in a registration request according to a second embodiment of the invention. The environment shown in FIG. 4 is substantially the same as that of FIG. 2A-4. However, in the second embodiment, the registration request 402 composed and sent by the mobile router contains information which will be used to install routes to the "mobile networks" associated with the mobile router. More particularly, the registration request 402 includes an extension which lists networks associated with the mobile router. This may eliminate the need for recursive tunneling.

Figure 5:
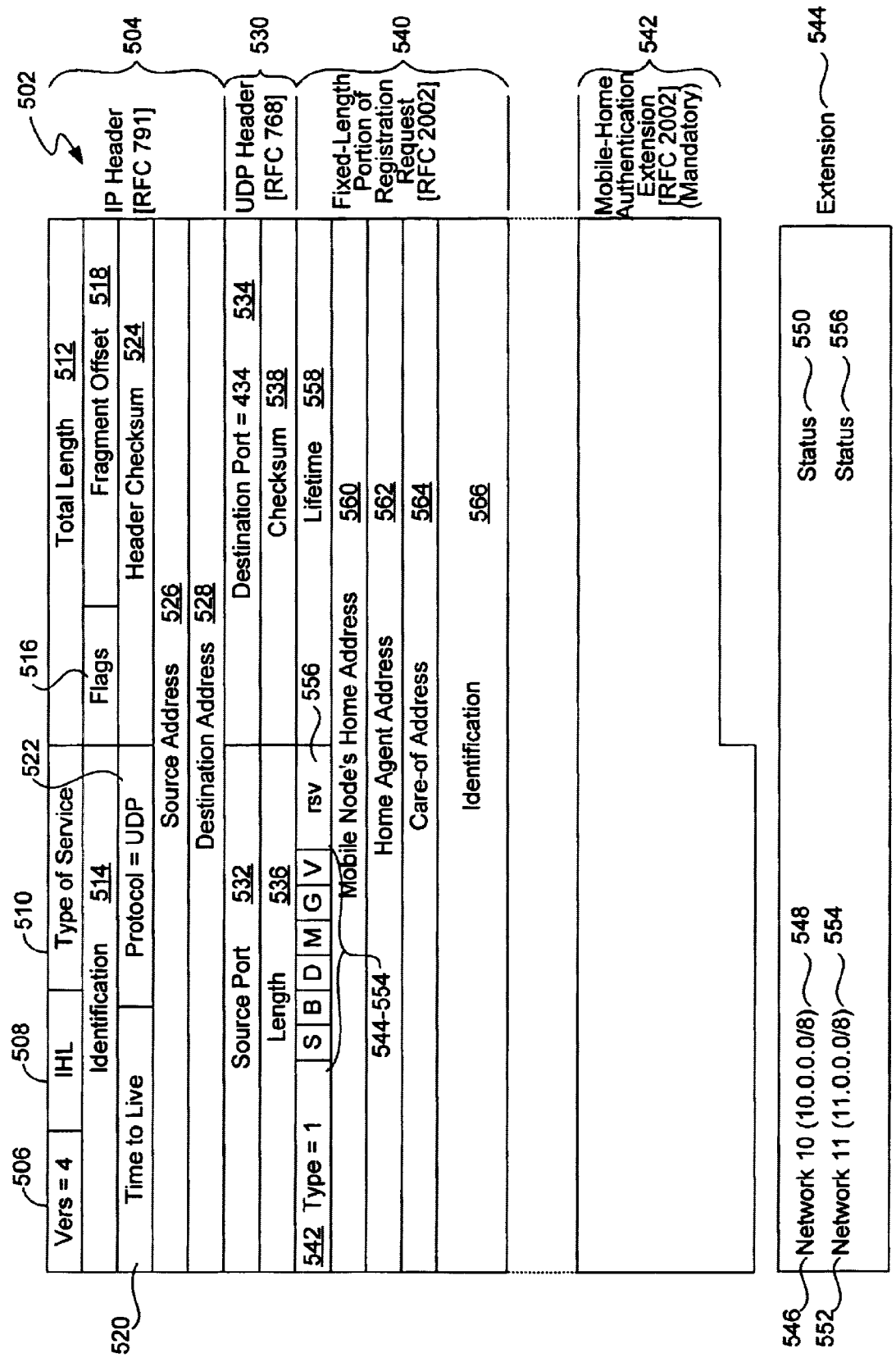
FIG. 5 is a diagram illustrating a registration request having an extension that may be sent by a Mobile IP mobile router in accordance with an embodiment of the invention.

The RFC provides a format for a registration request packet as well as optional extensions. FIG. 5 is a diagram illustrating a registration request having an extension that may be sent by a Mobile IP mobile router in accordance with an embodiment of the invention. As shown, a registration request packet 502 includes an IP Header 504 as defined in RFC 791. As is well-known in the field, the IP Header 504 includes a version field 506 which specifies which versions of the Internet Protocol are represented in the registration request packet 502. An Internet Header Length (IHL) field 508 provides the length of the IP header 504. In addition, a Type of Service field 510 is used to specify how the registration request packet 502 is to be handled in networks which offer various service qualities. A Total Length field 512 gives the length of the registration request packet in bytes. In addition, an Identification field 514 is a unique value chosen by the sender to allow a recipient to reassemble a packet that had been separated into fragments. A Flags field 516 and a Fragment Offset field 518 are both to separate an IP registration request packet into fragments to traverse networks that are unable to handle large IP packets. A Time to Live field 520 is used to limit the number of times an individual IP packet may be forwarded. A Protocol field 522 is used by the IP layer to determine which higher layer protocol created the "payload," or data passed down from the higher layer protocol, within the IP packet. A Header Checksum field 524 is used by a receiving node to verify that there was no error in transmission of the IP-header portion of the packet. In addition, the IP Header 504 includes a source address 526 and a destination address 528 of the registration request packet 502.

A UDP Header field 530 is provided by RFC 768. As is well-known in the field, the UDP Header field 530 includes a Source Port field 532, which is selected by the mobile node sending the registration request packet 502. In addition, a mobile node sets Destination Port field 534 to 434, the value reserved for Mobile IP registration messages. UDP Length field 536 provides the size of the UDP Payload (i.e., the Mobile IP fields) measured in bytes. In addition, a Checksum field 538 permits a receiving node to determine if an error occurred in transmission.

The registration request packet 502 further includes a Fixed-Length Portion 540 of the Registration Request which includes the Mobile IP Fields as provided in RFC 2002. As shown, the Fixed-Length Portion 540 includes multiple fields. A Type field 542 identifies the message as either a Registration Request or a Registration Reply. In addition, the mobile node sets an S bit 544 to 1 to ask that its home agent create or delete a binding for the specified care-of address without affecting any other existing bindings.

B, D, M, G, and V bits provide information required for routing of the registration request packet 502. A B bit 546 is set to 1 by a mobile node to request that the home agent provide it a copy of broadcast packets that occur on the home link. A D bit 548 informs the home agent which entity is performing decapsulation. The D bit 548 is set to 1 for a collocated care-of address and is set to 0 for a foreign agent care-of address. An M bit 550 and a G bit 552 request that the home agent use minimal encapsulation [RFC 2004] or generic routing encapsulation [RFC 1701] respectively, instead of IP in IP encapsulation [RFC 2003] for tunneling. A V bit 554 is set to 1 if the mobile node and foreign agent can support Van Jacobson Header Compression [RFC 1144] across the foreign link. In addition, an rsv field 556 may be reserved for future use.

The remaining fields provide information that may be used during registration of the mobile node. The mobile node sets lifetime field 558 to the number of seconds it would like its registration to last before it expires. In addition, a Mobile Node's Home Address 560 and Home Agent Address 562 are specified. Care-of Address field 564 is set to the specific care-of address being registered or deregistered by the mobile node. In addition, an Identification field 566 is chosen to be unique for each attempted registration. The Identification field 566 permits the mobile node to match Registration Requests with the corresponding Replies. This prevents an outsider from saving a copy of the Registration Request and resending it at a later time.

Each Registration Request message is required to contain a Mobile-Home Authentication Extension [RFC 2002] 542 to prove that the message was sent by the node that claims to have sent it. In addition, the RFC provides for optional extensions. However, the RFC does not suggest implementation details for these optional extensions.

According to the second embodiment, the Mobile IP registration request packet includes an extension 544 that specifies at least one network linked to a mobile router. As shown in FIG. 5, a first network 546, network 10, may be specified by its IP address 548 and an associated network status indicator 550. Similarly, a second network 552, network 11, may be specified by its IP address 554 and an associated network status indicator 556. Each network status indicator 550 and 556 specifies a first state when the corresponding network is up, and a second state when the network is down.

Figure 6A:
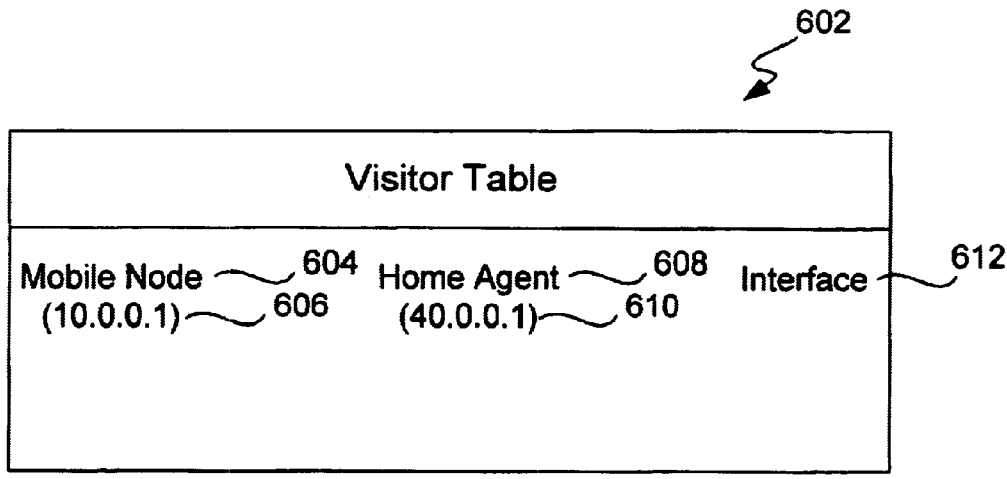
FIG. 6A is a diagram illustrating a conventional visitor table that may be used by an active Foreign Agent.

In addition, the Foreign Agent may map connectivity to the mobile networks through the mobile router. This may be accomplished through the use of a visitor table. FIG. 6A is a diagram illustrating a conventional visitor table that may be used by an active Foreign Agent. As shown, visitor table 602 associates mobile node 604 having an IP address 606 (e.g., 10.0.0.1/32) with Home Agent 608 having an IP address 610 (e.g., 40.0.0.1) and a corresponding interface 612. Therefore, each mobile node is typically stored in the visitor table.

Rather than storing an entry for each mobile node in the visitor table, it would be preferable to provide entries only for the networks associated with the mobile router. Packets addressed to nodes on such networks will have addresses indicating the associated networks. Thus, such packets can be forwarded to the appropriate networks.

Figure 6B:
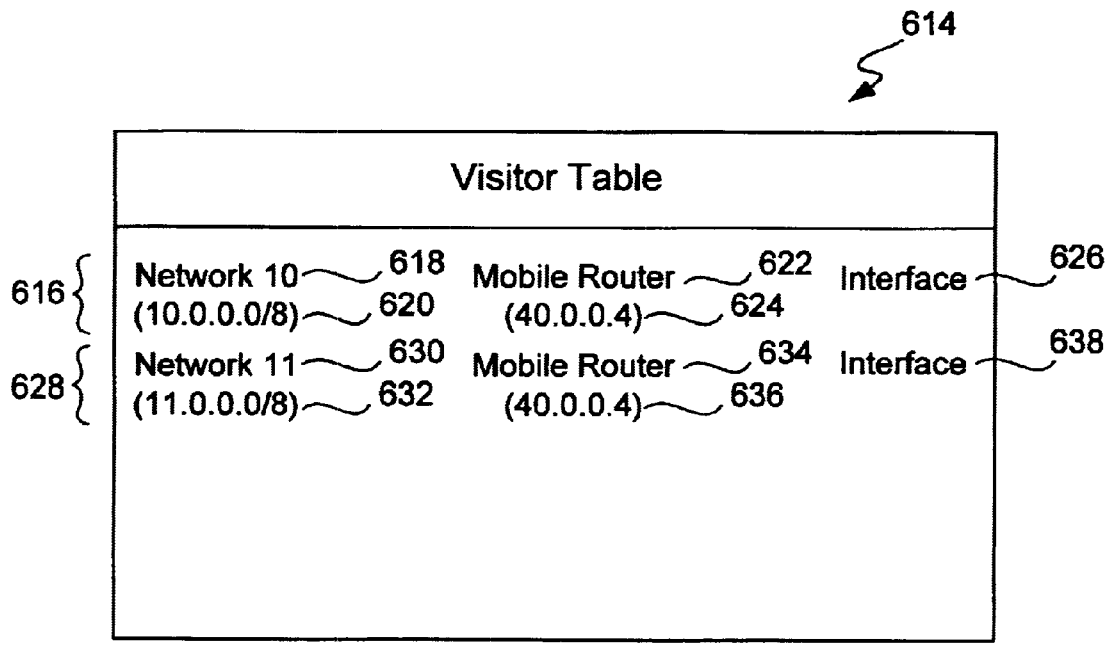
FIG. 6B is a diagram illustrating a visitor table that may be used by an active Foreign Agent in accordance with an embodiment of the invention.

FIG. 6B is a diagram illustrating a visitor table that may be used by an active Foreign Agent in accordance with an embodiment of the invention. Visitor table 614 includes an entry for one or more networks that are coupled to a mobile router such that the mobile router is associated with the one or more networks. As shown in FIG. 6B, a first entry 616 may include a first network 618, Network 10, designated by its IP address 620, 10.0.0.0/8, which is associated with mobile router 622, designated by its IP address 624, 40.0.0.4, and an interface 626. Similarly, a second entry 628 may include a second network 630, Network 11, designated by its IP address 632, 11.0.0.0/8, which is associated with mobile router 634, designated by its IP address 636, 40.0.0.4, and an interface 638. Therefore, in this example, both the networks 618, 630 are associated with the mobile router having the IP address 40.0.0.4. Accordingly, since visitor table entries are associated with networks rather than mobile nodes, the number of entries and memory space required for the visitor table remains small.

Figure 7:
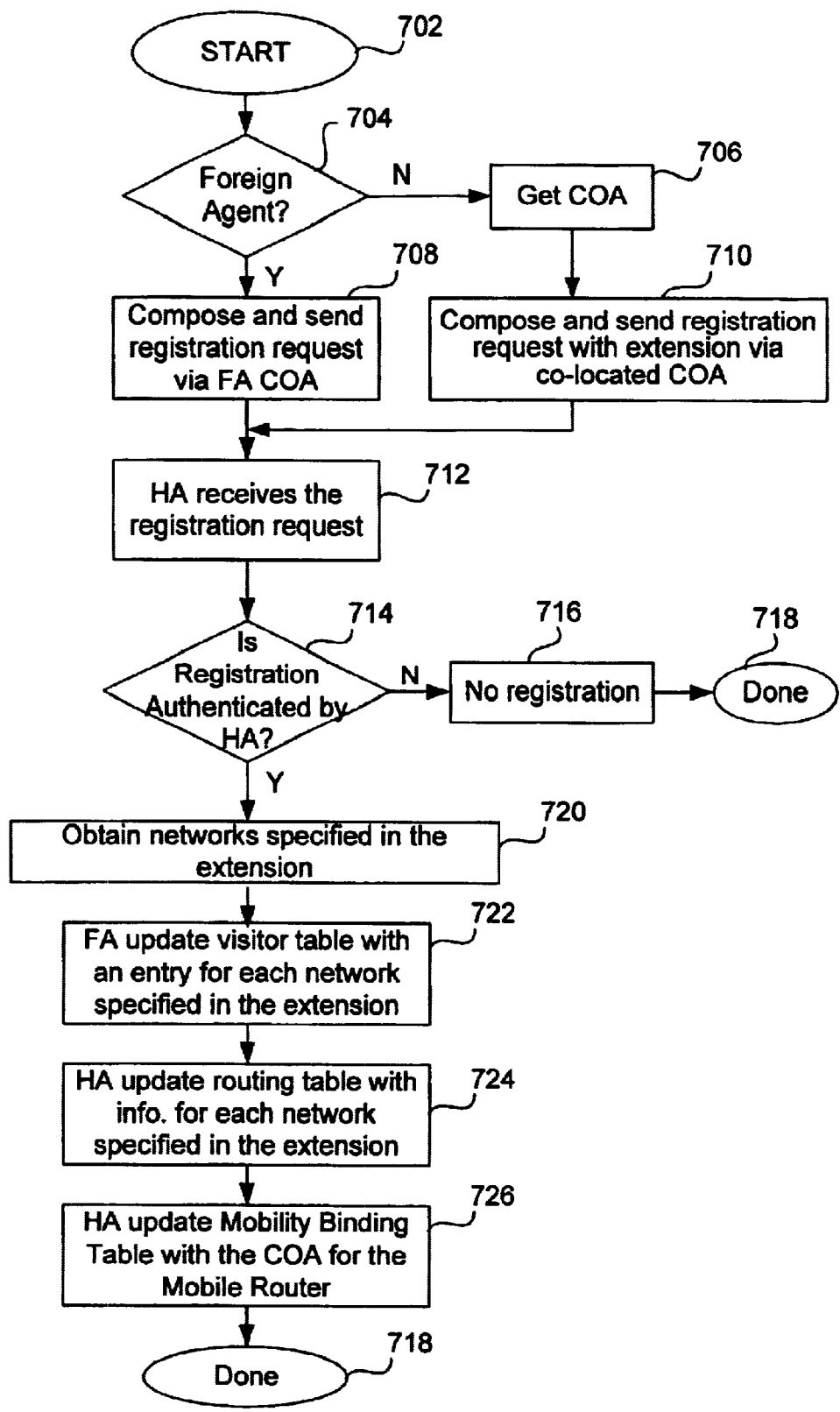
FIG. 7 is a process flow diagram illustrating the steps performed by a Home Agent and a Foreign Agent to provide mobile router functionality in accordance with the second embodiment of the invention.

Through the use of the registration request packet extension, the appropriate tables may be updated to remove networks that are non-functional. FIG. 7 is a process flow diagram illustrating the steps performed by a Home Agent and a Foreign Agent to provide mobile router functionality in accordance with the second embodiment of the invention. As shown, a registration process begins at step 702 and at step 704 the process flow diverges depending upon whether there is a foreign agent. If there is no foreign agent, a collocated care-of address is obtained at step 706.

Once the care-of address has been obtained, a registration request is composed and sent via the care-of address. If there is a foreign agent, the registration request is composed and sent via the foreign agent care-of address at step 708. Alternatively, after the collocated care-of address is obtained at step 706, the registration request is composed and sent via the collocated care-of address at step 710. Note that in either approach, composing the registration request includes creating and appending an extension listing all networks currently handled by the mobile router.

The Home Agent receives the registration request at step 712. The registration request comprises a registration request packet that includes the care-of address associated with the mobile router sending the registration request packet and an extension specifying at least one network linked to the mobile router. Next, at step 714, it is determined whether the registration is authenticated by the Home Agent as provided by RFC 2002. At step 716, if the registration is not authenticated, the mobile router is not registered with the Home Agent and the process is complete as indicated at step 718.

If the registration is authenticated, registration is completed in steps 720 through 724. At step 720, networks associated with the mobile router are identified from the extension of the registration request packet. By way of example, each network specified in the extension that has a status indicating that the network is in an active state may be identified. Next, at step 722, a visitor table associated with the Foreign Agent such as that illustrated in FIG. 6B may be updated with entries for selected networks that are specified in the extension. In this manner, the selected networks are associated with the mobile router, from the Foreign Agent's perspective. At step 724, the Home Agent updates a routing table such as that illustrated in FIGS. 2B-2 and 2B-3 and FIGS. 2C-2 and 2C-3 to associate the identified networks with the care-of address. Next, at step 726, the Home Agent updates a mobility binding table such as that illustrated in FIG. 2B-1 and 2C-1 to associate the care-of address with the mobile router. In this manner, only networks that are functional may be stored in the visitor table and the routing tables. Accordingly, the visitor and routing tables store minimal information, reducing the memory required to store the tables as well as the time required to search the tables.

The second implementation provides certain and additional advantages over the first implementation. Through the use of an extension which supplies networks (as opposed to nodes) associated with the mobile router, this implementation is scalable for many fixed nodes associated with the mobile router. Moreover, this implementation is dynamic since networks which are non-functional may be removed from the appropriate tables. In addition, a static mapping table such as that used in the first implementation is not required, yielding a dynamic registration system. As a result, tables may be updated without downtime. For example, the Home Agent can handle changes in the networks associated with the mobile router, without requiring an administrator to reconfigure the mapping table.

One significant advantage is that recursive tunneling is not required since the registration request packet extension contains the networks associated with the mobile node. Rather than use recursive tunneling, the Foreign Agent routes packets to the networks associated with the mobile router via the mobile router. As a result, the Foreign Agent may associate the mobile router with the networks and therefore ascertain that the destination of a packet is the mobile router. As described above, this may be accomplished through the creation of one or more entries in a visitor table. The Foreign Agent therefore has access to the networks associated with the mobile router. Thus, when a packet is later received by the Foreign Agent, the packet may be de-capsulated and forwarded using the visitor table.

Although there are various advantages to the use of an extension that specifies mobile networks, this approach could require further standardization beyond that specified in RFC 2002. The RFC does provide for extensions, as described above. However, standardization would require that such an extension be both publicized and adopted. Moreover, the mobile networks should have public IP addresses to be uniquely identified by a Foreign Agent.

Figure 8:
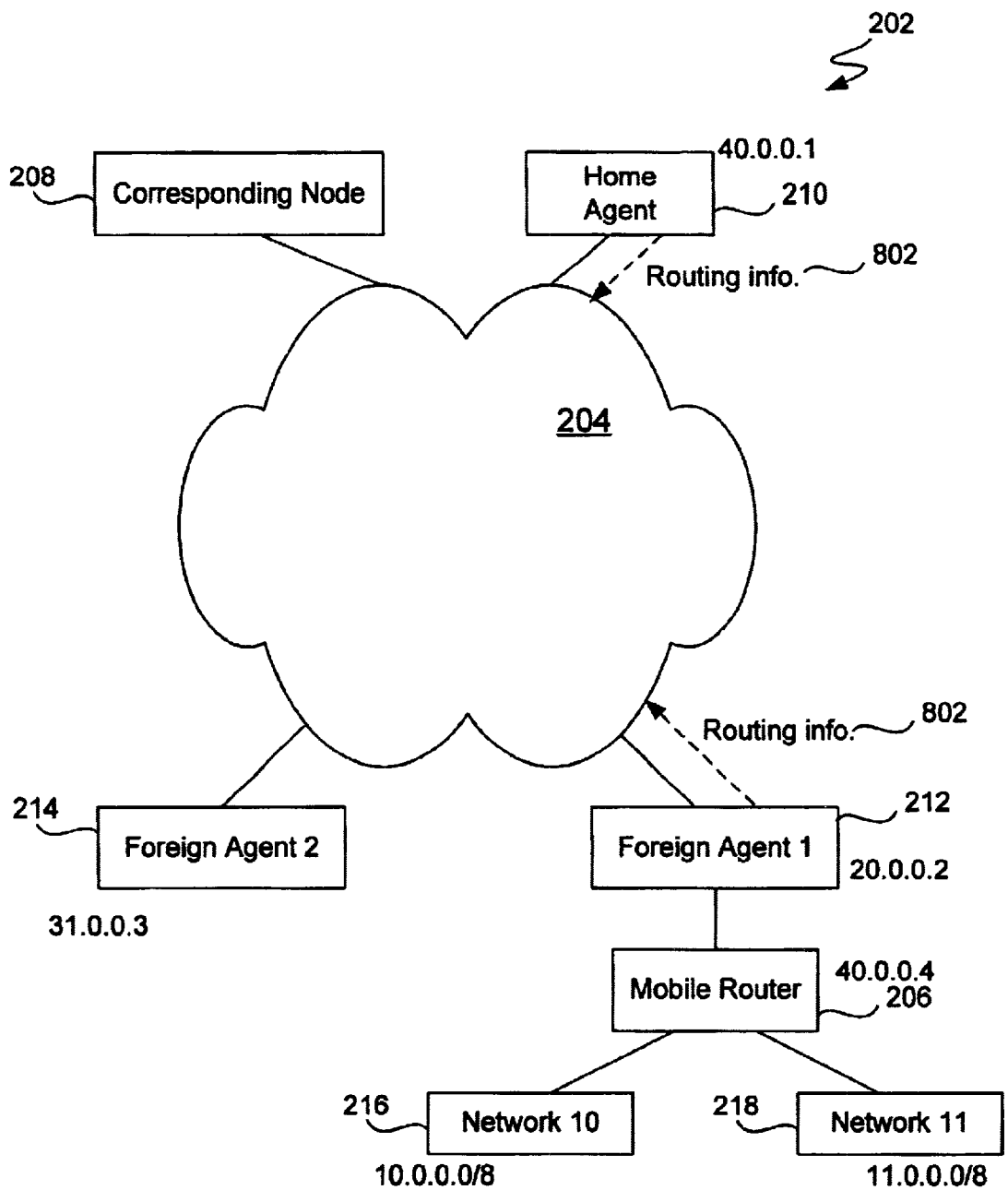
FIG. 8 is a diagram illustrating a Mobile IP mobile router and associated environment in which a Home Agent may install routes to mobile networks via IP routing protocols in accordance with a third embodiment of the invention.

Rather than requiring standardization of a registration request packet extension, it would be desirable if standard IP routing protocols could be used to update router information that changes during roaming in Mobile IP. FIG. 8 is a diagram illustrating a Mobile IP mobile router and associated environment in which a Home Agent may install routes to mobile networks via IP routing protocols in accordance with a third embodiment of the invention. The environment shown in FIG. 8 is substantially the same as that of FIG. 2A-4. However, in the third embodiment, routing information 802 is exchanged between the Home Agent and the Foreign Agent via normal IP routing protocols. This exchanged routing information may then be used to update the appropriate tables.

In the third embodiment, the Home Agent installs routes to networks associated with the mobile router which are received via an IP routing protocol. There are two modes of operation for the third embodiment. In both modes, the mobile router registers with the Home Agent via a care-of address. In the first mode, the care-of address is the IP address of a Foreign Agent. However, in the second mode, the care-of address is a collocated care-of address.

Figure 9:
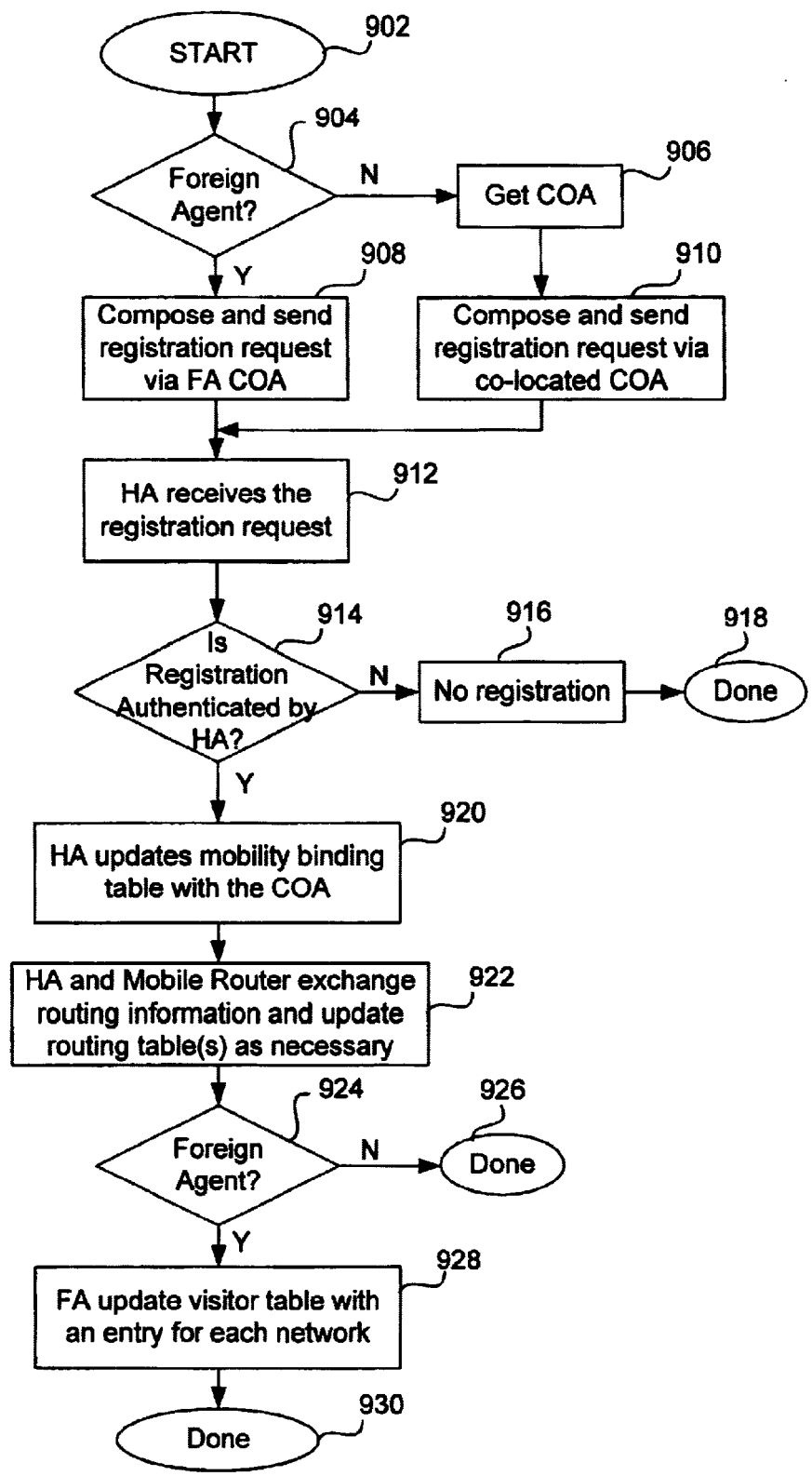
FIG. 9 is a process flow diagram illustrating the steps performed by a Home Agent and a Foreign Agent to provide mobile router functionality in accordance with the third embodiment of the invention.

FIG. 9 is a process flow diagram illustrating the steps performed by a Home Agent and a Foreign Agent to provide mobile router functionality in accordance with the third embodiment of the invention. A registration process begins at step 902 and at step 904 the process diverges depending upon whether there is a foreign agent. If there is no foreign agent, a collocated care-of address is obtained at step 906.

Once the care-of address has been obtained, a registration request is composed and sent via the care-of address. If there is a foreign agent, the registration request is composed and sent via the foreign agent care-of address at step 908. Alternatively, after the collocated care-of address is obtained at step 906, the registration request is composed and sent via the collocated care-of address at step 910.

The Home Agent receives the registration request at step 912. As described above, the registration request comprises a registration request packet that includes the care-of address for the mobile router. Next, at step 914, it is determined whether the registration is authenticated by the Home Agent. If the registration is not authenticated at step 916, the mobile router is not registered with the Home Agent and the process is complete as indicated at step 918.

If the registration is authenticated, registration is completed at the Home Agent in steps 920 through 928. A mobility binding table is updated at step 920 by the Home Agent to include the care-of address for the mobile router. The Home Agent and the mobile router subsequently exchange routing information and at least one routing table is updated to include the exchanged routing information at step 922.

The routing information is exchanged through a bi-directional tunnel between the Home Agent and the mobile router. In other words, routing information is encapsulated and tunneled from the Home Agent to the mobile router and routing information is reverse encapsulated and tunneled from the mobile router to the Home Agent. Such routing information may include the networks associated with the mobile router, metrics associated with the networks, and the status of the networks. The Home Agent may then update its routing table using this routing information, allowing the Home Agent to forward a packet to the care-of address specified in the routing table.

In accordance with the third embodiment, the routing information may be exchanged via any suitable IP routing protocol (e.g., Routing Information Protocol (RIP)). Routers typically include routing protocol software which provide other routers with routes that are available. However, routing protocols vary in the degree of "chattiness" (the number and size of messages transmitted to perform the routing protocol). Generally, routing protocols that require less bandwidth are preferred. For example, a routing protocol that requires relatively little bandwidth (e.g., link state) is preferred over a routing protocol that requires relatively greater bandwidth (e.g., distance vector). Accordingly, the bandwidth required by the protocol used is significant, particularly if routes do not change, since this creates a large amount of unnecessary traffic.

As described above, the exchanged routing information may specify networks associated with the mobile router. At least a portion of the exchanged routing information is then stored in at least one routing table. By way of example, a routing table associated with the Home Agent, the mobile router, or both, may be updated to link the networks with the care-of address for the mobile router.

If it is determined at step 924 that there is no Foreign Agent, the process is completed at step 926. Since there is no Foreign Agent, the mobile router may tunnel a routing update directly to the Home Agent rather than via the Foreign Agent. As a result, the first mode does not require a visitor table. Moreover, recursive tunneling is not required because routing updates are tunneled directly to the Home Agent.

If it is determined at step 924 that there is a Foreign Agent, a visitor table is updated at the Foreign Agent with an entry for the specified networks such that the mobile router is associated with the identified networks. The process is completed at step 930.

Installing routes to mobile networks via normal IP routing protocols provides numerous advantages. This implementation is scalable for many fixed nodes on networks associated with a mobile router since networks rather than specific hosts are included in the appropriate tables. Moreover, a mapping table is not required. As a result, when the status of associated networks changes, tables may be dynamically updated to reflect this information. In addition, the format of the registration request need not be altered as required in the second embodiment.

Although there are certain advantages, this implementation routes protocol traffic on a wireless link. As a result, in systems where bandwidth is limited, it may be desirable to chose one of the other embodiments described herein, or at least choose a routing protocol that consumes relatively little bandwidth. Additionally, this method requires recursive tunneling (i.e., the third encapsulation step) when a foreign agent is used since the Foreign Agent needs the care-of address to ascertain the networks associated with the mobile router. Thus, using a collocated care-of address may sometimes be desirable over using a Foreign Agent care-of address.

The present invention provides methods and apparatus permitting a mobile router to register with a Home Agent. The above-described embodiments permit registration via a Foreign Agent care-of address as well as a collocated care-of address. Accordingly, roaming nodes that do not have Mobile IP software, hardware and/or firmware may be provided Mobile IP functionality through the use of a mobile router.

The invention can also be embodied as computer readable code on a computer readable medium. The computer readable medium is any data storage device that can store data which can thereafter be read by a computer system. Examples of the computer readable medium include read-only memory, random-access memory, CD-ROMs, magnetic tape, and optical data storage devices.

The apparatus (Home Agent, Foreign Agent, and/or mobile router) of this invention may be specially constructed for the required purposes, or may be a general purpose programmable machine selectively activated or reconfigured by a computer program stored in memory. The processes presented herein are not inherently related to any particular router or other apparatus. In a preferred embodiment, any of the Home and Foreign Agents and mobile routers of this invention may be specially configured routers such as specially configured router models 2500, 2600, 3600, 4000, 4500, 4700, 7200, and 7500 available from Cisco Systems, Inc. of San Jose, Calif. A general structure for some of these machines will appear from the description given below.

Figure 10:
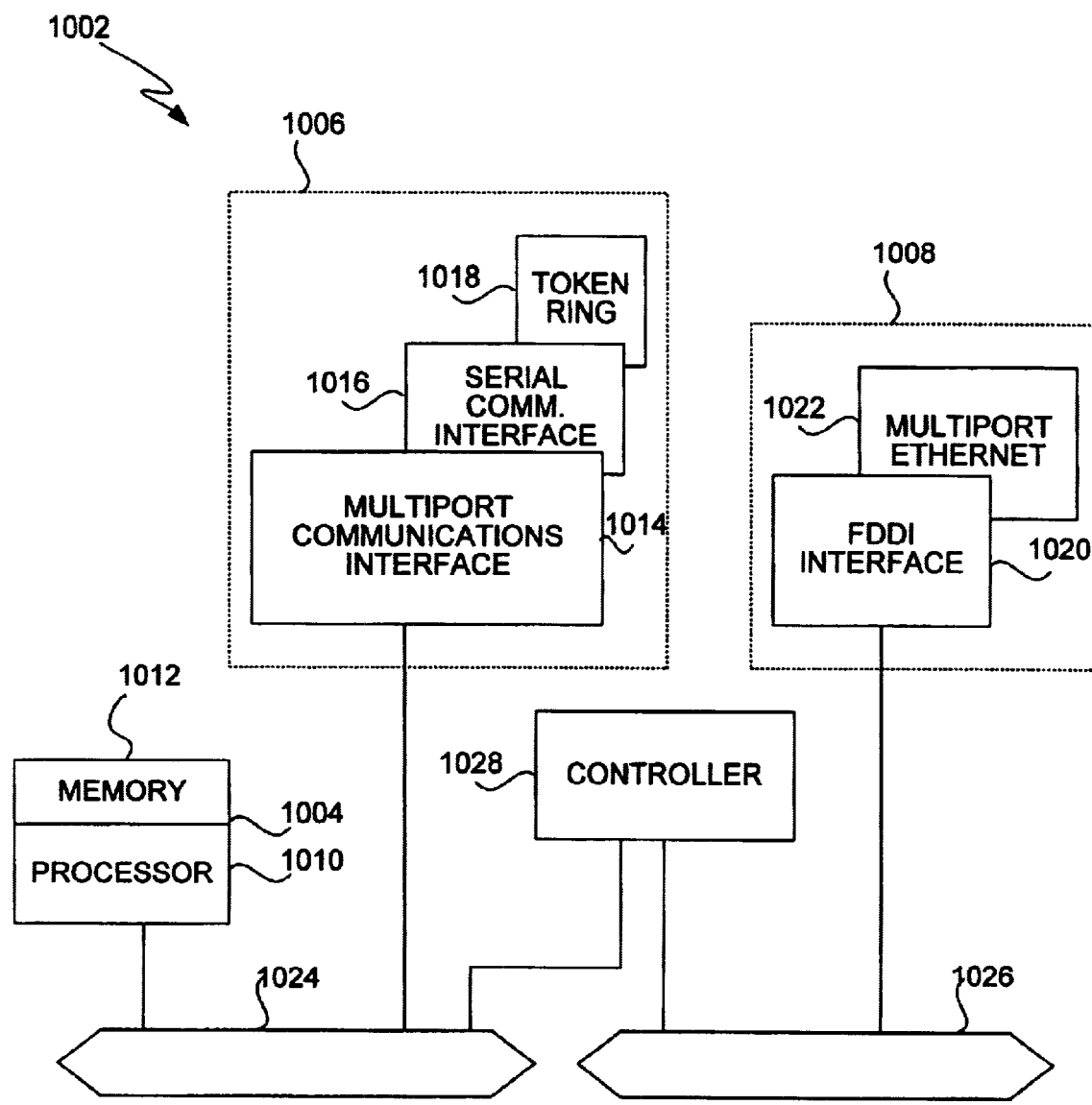
FIG. 10 is a block diagram of a network device that may be configured to implement aspects of the present invention.

Referring now to FIG. 10, a router/agent 1002 of the present invention includes a master central processing unit (CPU) 1004, low and medium speed interfaces 1006, and high speed interfaces 1008. When acting under the control of appropriate software or firmware, the CPU 1004 is responsible for such router tasks as routing table computations and network management. It is also responsible for registration, packet tunneling and other Mobile IP functions of a Home Agent or a Foreign Agent. It may include one or more microprocessor chips 1010 selected from complex instruction set computer (CISC) chips (such as the Motorola MPC860 microprocessor or the Motorola 68030 microprocessor, reduced instruction set computer (RISC) chips, or other available chips). In a preferred embodiment, a memory 1012 (such as non-volatile RAM and/or ROM) also forms part of CPU 1004. However, there are many different ways in which memory could be coupled to the system.

The interfaces 1008 and 1006 are typically provided as interface cards. Generally, they control the sending and receipt of data packets over the network and sometimes support other peripherals used with the router 1002. The low and medium speed interfaces 1006 include a multiport communications interface 1014, a serial communications interface 1016, and a token ring interface 1018. The high speed interfaces 1008 include an FDDI interface 1020 and a multiport ethernet interface 1022. Preferably, each of these interfaces (low/medium and high speed) includes (1) a plurality of ports appropriate for communication with the appropriate media, and (2) an independent processor such as the 2901 bit slice processor (available from Advanced Micro Devices corporation of Santa Clara Calif.), and in some instances (3) volatile RAM. The independent processors control such communications intensive tasks as packet switching and filtering, and media control and management. By providing separate processors for the communications intensive tasks, this architecture permits the master microprocessor 1004 to efficiently perform routing computations, network diagnostics, security functions, etc.

The low and medium speed interfaces are coupled to the master CPU 1004 through a data, control, and address bus 1024. High speed interfaces 1008 are connected to the bus 1024 through a fast data, control, and address bus 1026 which is in turn connected to a bus controller 1028. The bus controller functions are provided by a processor such as a 2901 bit slice processor.

Although the system shown in FIG. 10 is a preferred router of the present invention, it is by no means the only router architecture on which the present invention can be implemented. For example, an architecture having a single processor that handles communications as well as routing computations, etc. would also be acceptable. Further, other types of interfaces and media could also be used with the router. Still further, in some cases, the invention can be implemented on network devices other than routers.

Although illustrative embodiments and applications of this invention are shown and described herein, many variations and modifications are possible which remain within the concept, scope, and spirit of the invention, and these variations would become clear to those of ordinary skill in the art after perusal of this application. For instance, although the specification has described routers, other entities used to tunnel packets to mobile nodes on remote network segments can be used as well. For example, bridges or other less intelligent packet switches may also employ the standby protocol of this invention. Accordingly, the present embodiments are to be considered as illustrative and not restrictive, and the invention is not to be limited to the details given herein, but may be modified within the scope and equivalents of the appended claims.

What is claimed is:

1. A Home Agent supporting Mobile IP for use with a mobile router which registers with the Home Agent, the Home Agent comprising:

a memory; and a processor coupled to the memory, wherein the memory and the processor are adapted to provide:

(a) a routing table having an entry for one or more networks that are coupled to and associated with the mobile router, wherein each entry in the routing table includes a care-of address associated with the one or more networks; and (b) a mobility binding table that associates the mobile router with the care-of address.

2. The Home Agent as recited in claim 1, wherein the one or more networks and the mobile router are each designated by an IP address.

3. The Home Agent as recited in claim 1, wherein the care-of address is a foreign agent address or a collocated care-of address.

4. The Home Agent as recited in claim 1, wherein the memory further includes:

a mapping table associating the mobile router with the one or more networks.

5. The Home Agent as recited in claim 4, wherein the mapping table is static during registration of the mobile router.

6. In a Home Agent, a method for providing Mobile IP mobile router functionality, the method comprising:

receiving a registration request packet, the registration request packet including a care-of address for the mobile router;

identifying networks associated with the mobile router;

updating a routing table to associate the identified networks with the care-of address; and updating a mobility binding table to include the care-of address for the mobile router.

7. The method as recited in claim 6, wherein identifying networks includes:

obtaining the networks associated with the mobile router from a mapping table associating the mobile router with the networks.

8. The method as recited in claim 6, wherein identifying networks further includes:

obtaining the networks associated with the mobile router from the registration request packet.

9. The method as recited in claim 8, wherein the registration request packet includes an extension specifying the networks linked to the mobile router and a status associated with each network, wherein obtaining the networks includes:

ascertaining each network specified in the extension that has a status indicating that the network is in an active state.

10. The method as recited in claim 6, wherein the care-of address is an IP address of a Foreign Agent.

11. The method as recited in claim 6, wherein the care-of address is a collocated care-of address.

12. The method as recited in claim 6, wherein the registration request packet includes an extension specifying at least one network linked to and associated with a mobile router.

13. The method as recited in claim 12, where each network specified in the extension is associated with a network status.

14. The method as recited in claim 13, wherein the network status is in a first state when the network is up, and is otherwise in a second state.

15. In a Foreign Agent supporting Mobile IP a method for use with a mobile router which registers with a Home Agent via the Foreign Agent, comprising:

receiving a registration request packet including an extension specifying one or more networks linked to and associated with the mobile router;

obtaining the networks linked to and associated with the mobile router from the registration request packet; and updating a visitor table to include an entry for the one or more networks that are linked to and associated with the mobile router such that the mobile router is associated with the one or more networks.

16. The method as recited in claim 15, wherein the one or more networks are each designated by an IP address.

17. The method as recited in claim 15, wherein the mobile router is designated by an IP address.

18. A method for providing Mobile IP mobile router functionality in a Home Agent, the method comprising:

receiving a registration request, the registration request including a care-of address associated with a mobile router and an extension specifying at least one network linked to the mobile router;

identifying networks associated with the mobile router from the extension;

updating a routing table to associate the identified networks with the care-of address; and updating a mobility binding table to associate the care-of address with the mobile router.

19. The method as recited in claim 18, further including:

updating a visitor table at a Foreign Agent with entries for selected networks that are specified in the extension such that the selected networks are associated with the mobile router.

20. The method as recited in claim 18, wherein the extension further includes a status for each network associated with the mobile router, identifying networks further including:

ascertaining each network specified in the extension that has a status indicating that the network is in an active state.

21. A method for providing Mobile IP mobile router functionality, the method comprising:

receiving a registration request packet, the registration request packet including a care-of address for the mobile router;

updating a mobility binding table to include the care-of address for the mobile router;

exchanging routing information between a Home Agent and a mobile router such that the Home Agent receives information specifying one or more networks coupled to the mobile router; and updating at least one routing table to include the exchanged routing information such that the one or more specified networks coupled to the mobile router are associated with the care-of address.

22. The method as recited in claim 21, further including:

updating a visitor table at a Foreign Agent with an entry for the specified networks such that the mobile router is associated with the identified networks.

23. The method as recited in claim 22, wherein updating a visitor table is performed when the care-of address is an IP address of a Foreign Agent.

24. The method as recited in claim 21, wherein updating at least one routing table includes:

storing at least a portion of the exchanged routing information in a routing table associated with the Home Agent.

25. The method as recited in claim 21, wherein updating at least one routing table includes:

storing at least a portion of the exchanged routing information in a routing table associated with the mobile router.

26. The method as recited in claim 21, wherein exchanging routing information is performed via an IP routing protocol.

27. A computer-readable medium storing thereon computer-readable instructions for providing Mobile IP mobile router functionality in a Home Agent, comprising:

instructions for receiving a registration request packet, the registration request packet including a care-of address for the mobile router;

instructions for identifying networks associated with the mobile router;

instructions for updating a routing table to associate the identified networks with the care-of address; and instructions for updating a mobility binding table to include the care-of address for the mobile router.

28. A Home Agent adapted for providing Mobile IP mobile router functionality, comprising:

a processor; and a memory, at least one of the processor and the memory being adapted for:

receiving a registration request packet, the registration request packet including a care-of address for the mobile router;

identifying networks associated with the mobile router;

updating a routing table to associate the identified networks with the care-of address; and updating a mobility binding table to include the care-of address for the mobile router.

29. A Home Agent adapted for providing Mobile IP mobile router functionality, comprising:

means for receiving a registration request packet, the registration request packet including a care-of address for the mobile router;

means for identifying networks associated with the mobile router;

means for updating a routing table to associate the identified networks with the care-of address; and means for updating a mobility binding table to include the care-of address for the mobile router.

30. A computer-readable medium storing thereon computer-readable instructions for providing Mobile IP mobile router functionality in a Home Agent, comprising:

instructions for receiving a registration request, the registration request including a care-of address associated with a mobile router and an extension specifying at least one network linked to the mobile router;

instructions for identifying networks associated with the mobile router from the extension;

instructions for updating a routing table to associate the identified networks with the care-of address; and instructions for updating a mobility binding table to associate the care-of address with the mobile router.

31. A Home Agent adapted for providing Mobile IP mobile router functionality in a Home Agent, comprising:

a processor; and a memory, at least one of the processor and the memory being adapted for:
- receiving a registration request, the registration request including a care-of address associated with a mobile router and an extension specifying at least one network linked to the mobile router;
- identifying networks associated with the mobile router from the extension;
- updating a routing table to associate the identified networks with the care-of address; and
- updating a mobility binding table to associate the care-of address with the mobile router.

32. A Home Agent adapted for providing Mobile IP mobile router functionality in a Home Agent, comprising:
- means for receiving a registration request, the registration request including a care-of address associated with a mobile router and an extension specifying at least one network linked to the mobile router;
- means for identifying networks associated with the mobile router from the extension;
- means for updating a routing table to associate the identified networks with the care-of address; and
- means for updating a mobility binding table to associate the care-of address with the mobile router.

33. A computer-readable medium storing thereon computer-readable instructions for providing Mobile IP mobile router functionality, comprising:
- instructions for receiving a registration request packet, the registration request packet including a care-of address for the mobile router;
- instructions for updating a mobility binding table to include the care-of address for the mobile router;
- instructions for exchanging routing information between a Home Agent and a mobile router such that the Home Agent receives information specifying one or more networks coupled to the mobile router; and
- instructions for updating at least one routing table to include the exchanged routing information such that the one or more specified networks coupled to the mobile router are associated with the care-of address.

34. A Home Agent adapted for providing Mobile IP mobile router functionality, comprising:
- a processor; and
- a memory, at least one of the processor and the memory being adapted for:
  - receiving a registration request packet, the registration request packet including a care-of address for the mobile router;
  - updating a mobility binding table to include the care-of address for the mobile router;
  - exchanging routing information between the Home Agent and a mobile router such that the Home Agent receives information specifying one or more networks coupled to the mobile router; and
  - updating at least one routing table to include the exchanged routing information such that the one or more specified networks coupled to the mobile router are associated with the care-of address.

35. A Home Agent adapted for providing Mobile IP mobile router functionality, comprising:
- means for receiving a registration request packet, the registration request packet including a care-of address for the mobile router;
- means for updating a mobility binding table to include the care-of address for the mobile router;
- means for exchanging routing information between the Home Agent and a mobile router such that the Home Agent receives information specifying one or more networks coupled to the mobile router; and
- means for updating at least one routing table to include the exchanged routing information such that the one or more specified networks coupled to the mobile router are associated with the care-of address.

36. A Foreign Agent supporting Mobile IP a method for use with a mobile router which registers with a Home Agent via the Foreign Agent, comprising:
- means for receiving a registration request packet including an extension specifying one or more networks linked to and associated with the mobile router;
- means for obtaining the networks linked to and associated with the mobile router from the registration request packet; and
- means for updating a visitor table to include an entry for the one or more networks that are linked to and associated with the mobile router such that the mobile router is associated with the one or more networks.

37. A Foreign Agent supporting Mobile IP a method for use with a mobile router which registers with a Home Agent via the Foreign Agent, comprising:
- a processor; and
- a memory, at least one of the processor and the memory being adapted for:
  - receiving a registration request packet including an extension specifying one or more networks linked to and associated with the mobile router;
  - obtaining the networks linked to and associated with the mobile router from the registration request packet; and
  - updating a visitor table to include an entry for the one or more networks that are linked to and associated with the mobile router such that the mobile router is associated with the one or more networks.

38. A computer-readable medium storing thereon computer-readable instructions for performing a method for use with a mobile router which registers with a Home Agent via a Foreign Agent supporting Mobile IP, comprising:
- receiving a registration request packet including an extension specifying one or more networks linked to and associated with the mobile router;
- obtaining the networks linked to and associated with the mobile router from the registration request packet; and
- updating a visitor table to include an entry for the one or more networks that are linked to and associated with the mobile router such that the mobile router is associated with the one or more networks.

* * * * *